United States Patent
Lee et al.

(10) Patent No.: US 12,123,768 B2
(45) Date of Patent: Oct. 22, 2024

(54) METHOD FOR RECOGNIZING OBJECT BY USING MILLIMETER WAVE AND ELECTRONIC DEVICE SUPPORTING SAME METHOD

(71) Applicant: Samsung Electronics Co., Ltd., Gyeonggi-do (KR)

(72) Inventors: Sunkey Lee, Gyeonggi-do (KR); Hyunah Oh, Gyeonggi-do (KR); Hyunkee Min, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 17/426,175

(22) PCT Filed: Jan. 31, 2020

(86) PCT No.: PCT/KR2020/001542
§ 371 (c)(1),
(2) Date: Jul. 28, 2021

(87) PCT Pub. No.: WO2020/159320
PCT Pub. Date: Aug. 6, 2020

(65) Prior Publication Data
US 2022/0101650 A1    Mar. 31, 2022

(30) Foreign Application Priority Data
Feb. 1, 2019 (KR) .......................... 10-2019-0013338

(51) Int. Cl.
*G01J 1/42* (2006.01)
*G01S 7/41* (2006.01)
(Continued)

(52) U.S. Cl.
CPC ............. *G01J 1/4204* (2013.01); *G01S 7/412* (2013.01); *G01S 13/867* (2013.01); *G01S 13/89* (2013.01);
(Continued)

(58) Field of Classification Search
CPC ...... G01S 13/88; G01S 13/9027; G01S 13/89; G01S 13/867; G01S 7/41; G01S 7/412;
(Continued)

(56) References Cited

U.S. PATENT DOCUMENTS 7,432,848 B2 * 10/2008 Munakata ............. G01S 13/867
342/52
7,706,978 B2 * 4/2010 Schiffmann ........... G01S 7/4026
342/197

(Continued)

FOREIGN PATENT DOCUMENTS

JP           10-260252 A    9/1998
KR    10-2014-0107946 A    9/2014
(Continued)

OTHER PUBLICATIONS

Korean Office Action dated Apr. 27, 2024.

*Primary Examiner* — Timothy A Brainard
*Assistant Examiner* — Michael W Justice
(74) *Attorney, Agent, or Firm* — Cha & Reiter, LLC

(57) ABSTRACT

An electronic device may comprise: an antenna module; a communication circuit; a processor; and a memory, wherein the memory stores instructions which, when executed, cause the processor to: output first beams each having a first beam width to a first spatial range around the electronic device; receive a first reflective pattern with respect to the first beams; determine at least one section in which the external object is disposed, among a plurality of sections configuring the first spatial range; output second beams each having a (Continued)

second beam width to the at least one section; receive a second reflective pattern with respect to the second beams; recognize the external object on the basis of the second reflective pattern of the second beams to authenticate a user; and output third beams to determine state information or motion information of the external object.

13 Claims, 16 Drawing Sheets

(51) Int. Cl.
  *G01S 13/86*   (2006.01)
  *G01S 13/89*   (2006.01)
  *G05D 1/00*   (2024.01)
  *G06F 21/32*   (2013.01)
  *G06V 40/16*   (2022.01)
  *H01Q 1/24*   (2006.01)
  *H04N 23/11*   (2023.01)

(52) U.S. Cl.
  CPC ............ *G06F 21/32* (2013.01); *G06V 40/166* (2022.01); *G06V 40/172* (2022.01); *G06V 40/174* (2022.01); *H01Q 1/243* (2013.01); *H04N 23/11* (2023.01); *G05D 1/0238* (2013.01); *G05D 1/0242* (2013.01)

(58) Field of Classification Search
  CPC .......... G01S 7/417; G06F 21/33; G06F 21/31; G06F 1/3231; H01Q 1/243; G06V 40/166; G06V 40/174; G06V 40/172; G06V 40/171
  USPC ...................... 342/52, 90; 382/118
  See application file for complete search history.

(56) References Cited

U.S. PATENT DOCUMENTS

| | | | | |
|---|---|---|---|---|
| 7,809,171 B2* | 10/2010 | Solinsky | .............. | G06V 40/166 382/117 |
| 8,089,518 B2* | 1/2012 | Fahn | ..................... | G01S 3/7865 348/208.14 |
| 9,081,092 B1* | 7/2015 | Friesel | .................. | G01S 13/426 |
| 9,731,729 B2* | 8/2017 | Solyom | ................ | B60W 10/04 |
| 10,102,419 B2* | 10/2018 | Allyn | ..................... | G01S 13/867 |
| 10,165,177 B2* | 12/2018 | Nielsen | .................. | H04N 25/46 |
| 10,394,333 B2 | 8/2019 | Cheng et al. | | |
| 10,466,772 B2 | 11/2019 | Trotta | | |
| 10,535,264 B2* | 1/2020 | Takaki | .................. | G08G 1/165 |
| 10,573,959 B2* | 2/2020 | Alland | ..................... | H01Q 3/28 |
| 10,591,586 B2* | 3/2020 | Trotta | ................... | G01S 13/867 |
| 10,605,911 B1* | 3/2020 | Parker | ..................... | G01S 13/42 |
| 10,620,307 B2* | 4/2020 | Yavari | ..................... | G01S 13/86 |
| 10,627,507 B1* | 4/2020 | Parker | ................... | H01Q 25/00 |
| 10,657,363 B2* | 5/2020 | Alameh | .................... | G06T 7/20 |
| 10,901,497 B2 | 1/2021 | Trotta | | |
| 11,002,830 B2* | 5/2021 | Iida | ......................... | G01S 7/354 |
| 11,100,204 B2* | 8/2021 | Alameh | .............. | H04L 63/0861 |
| 11,374,635 B2* | 6/2022 | Huang | ................ | H04W 72/542 |
| 11,656,333 B2* | 5/2023 | Trotta | ..................... | G01S 7/412 342/52 |
| 2007/0055446 A1* | 3/2007 | Schiffmann | ........... | G01S 13/867 701/301 |
| 2007/0171121 A1* | 7/2007 | Munakata | .............. | G01S 13/931 342/146 |
| 2009/0128647 A1* | 5/2009 | Fahn | ...................... | H04N 23/695 348/E5.037 |
| 2010/0002912 A1* | 1/2010 | Solinsky | ................. | G06V 40/19 382/117 |
| 2015/0266488 A1* | 9/2015 | Solyom | .................. | B60W 10/04 701/28 |
| 2017/0123058 A1* | 5/2017 | Yavari | ..................... | G01S 13/86 |
| 2017/0124384 A1* | 5/2017 | Allyn | ....................... | G01S 13/89 |
| 2017/0309997 A1* | 10/2017 | Alland | .................... | H01Q 21/29 |
| 2017/0317729 A1* | 11/2017 | Kobayashi | .......... | H04W 64/006 |
| 2018/0196501 A1 | 7/2018 | Trotta | | |
| 2018/0373340 A1 | 12/2018 | Cheng et al. | | |
| 2019/0011534 A1* | 1/2019 | Trotta | ................... | G01S 13/89 |
| 2019/0056488 A1* | 2/2019 | Vacanti | ..................... | G01S 7/04 |
| 2019/0130171 A1* | 5/2019 | Alameh | .................. | G06V 20/64 |
| 2019/0130752 A1* | 5/2019 | Takaki | ..................... | B60T 7/12 |
| 2019/0170856 A1* | 6/2019 | Iida | ........................ | G01S 13/343 |
| 2019/0393944 A1* | 12/2019 | Huang | ................. | H04B 7/0874 |
| 2020/0019235 A1 | 1/2020 | Trotta | | |
| 2020/0026830 A1* | 1/2020 | Alameh | .................. | H04L 63/105 |
| 2020/0166609 A1* | 5/2020 | Trotta | ..................... | G01S 7/417 |

FOREIGN PATENT DOCUMENTS

| | | | | |
|---|---|---|---|---|
| KR | 101726940 B1 * | 4/2017 | ............ | G01S 13/74 |
| KR | 10-2018-0082322 A | 7/2018 | | |
| KR | 10-1914281 B1 | 11/2018 | | |
| KR | 10-2019-0005740 A | 1/2019 | | |

* cited by examiner

METHOD FOR RECOGNIZING OBJECT BY USING MILLIMETER WAVE AND ELECTRONIC DEVICE SUPPORTING SAME METHOD

CROSS REFERENCE TO RELATED APPLICATIONS

This application is a National Phase Entry of PCT International Application No. PCT/KR2020/001542, which was filed on Jan. 31, 2020, and claims a priority to Korean Patent Application No. 10-2019-0013338, which was filed on Feb. 1, 2019, the contents of which are incorporated herein by reference.

TECHNICAL FIELD

One or more embodiments disclosed in the disclosure generally relate to an object recognition method using millimeter-wave and an electronic device supporting the same.

BACKGROUND ART

An electronic device such as a smart phone or a tablet PC may recognize a surrounding object using various sensors or cameras. For example, the electronic device may photograph a user's face using a camera to perform user authentication. In turn, the electronic device may execute an application requiring security (e.g., banking application) based on the user authentication.

TECHNICAL PROBLEM

A conventional electronic device may use a camera to authenticate the user's face or to recognize the user's facial expression or gesture. The electronic device may collect and analyze image data of the user using the camera. In this case however, when there is no light or insufficient light in the environment, the user's face or the user's gesture may not be recognized or the recognition ability may be lowered. Further, when there is insufficient light, it may be difficult to separate the image of the user's face image from images of gestures by the user in the image data collected using the camera.

TECHNICAL SOLUTION

An electronic device may include an antenna module configured to emit and receive millimeter-wave, a communication circuit configured to control the antenna module, a processor operatively connected to the communication circuit, and a memory operatively connected to the processor. The memory may store therein instructions. When the instructions are executed by the processor, the instructions may cause the processor to control the antenna module to output first beams having a first beam width toward a first spatial range around the electronic device, control the antenna module to receive a first reflection pattern of the first beams, determine at least one section containing one or more external objects among a plurality of sections constituting the first spatial range, based on the first reflection pattern of the first beams, control the antenna module to output second beams having a second beam width smaller than the first beam width toward the at least one section, control the antenna module to receive a second reflection pattern of the second beams, recognize the one or more external objects based on the second reflection pattern of the second beams, and authenticate a user based on the recognizing result, and control the antenna module to output third beams when the user is authenticated, and determine state information or motion information of the one or more external objects, based on the third beams.

Advantageous Effects

The electronic device according to certain embodiments disclosed herein may output millimeter-wave to recognize an object, e.g. the user. The electronic device may emit millimeter-waves having different beam widths to perform the face recognition process.

The electronic device according to certain embodiments disclosed herein may authenticate the user's face in an environment in which the camera cannot operate normally, and may recognize the user's gesture or facial expression after performing facial authentication.

The electronic device according to certain embodiments disclosed herein may recognize the gesture or facial expression of an authenticated user and use the recognized gesture or facial expression in various applications.

BRIEF DESCRIPTION OF DRAWINGS

In connection with the description of the drawings, the same or similar reference numerals may be used for the same or similar components.

DETAILED DESCRIPTION

Figure 1:
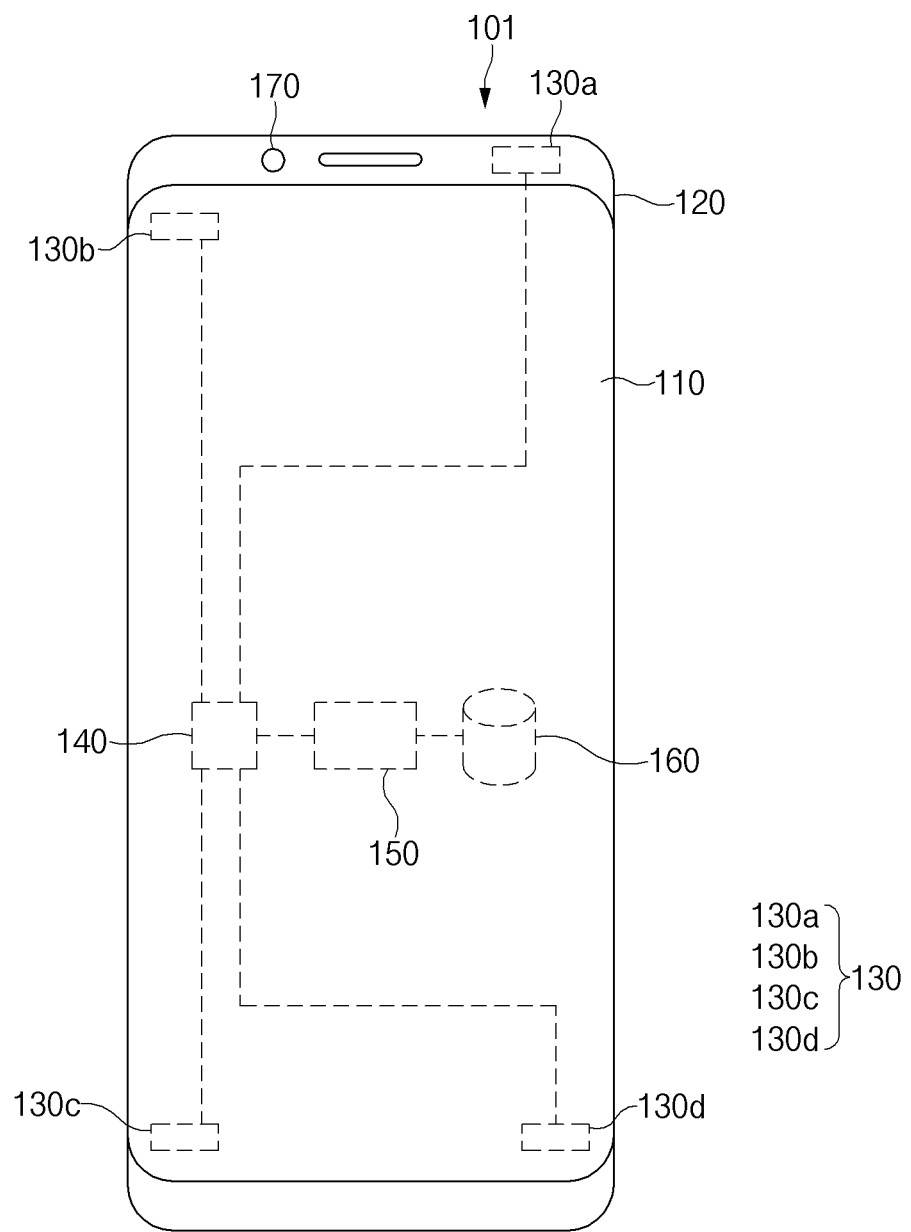
FIG. 1 shows an electronic device capable of recognizing an external object according to an embodiment.

Hereinafter, various embodiments of the disclosure are described with reference to the accompanying drawings. However, those embodiments are not intended to limit techniques described in the disclosure to specific embodiments. It should be understood that the disclosure includes various modifications, equivalents, and/or alternatives of an embodiment of the disclosure. In connection with the description of the drawings, like reference numerals may be used for like components.

FIG. 1 shows an electronic device capable of recognizing the external object according to an embodiment.

Referring to FIG. 1, the electronic device 101 may include a display 110, a housing 120, an antenna module 130, a communication circuit 140, a processor 150, a memory 160, and a camera 170.

The display 110 may include, for example, a liquid crystal display (LCD), a light emitting diode (LED) display, an organic light emitting diode (OLED) display, a microelectromechanical system (MEMS) display, or an electronic paper. The display 110 may, for example, display various contents (e.g., text, image, video, icon, and/or symbol, etc.) to a user. The display 110 may include a touch screen, and for example, may receive a touch, gesture, proximity, or hovering input using an electronic pen or a portion of the user's body. The display 110 may be exposed to an outside through a portion of the housing.

According to an embodiment, the housing 120 may encapsulate various components for operating the electronic device 101 therein. For example, the housing 120 may include the antenna module 130, the communication circuit 140, the processor 150 and the memory 160 therein.

The antenna module 130 may emit and receive millimeter-wave (or mmWave). For example, millimeter-wave may be an ultra-high frequency of about 30 to 300 GHz. The millimeter-wave may increase transmission/reception efficiency of the electronic device by employing beamforming technique of multiple antennas.

According to an embodiment, the antenna module 130 may output millimeter-wave for recognizing the external object. The antenna module 130 may emit millimeter-wave in a designated direction (e.g., a direction toward the external object) using beamforming. The antenna module 130 may receive a signal when the millimeter-wave signal emitted from the antenna module 130 is then reflected from the external object.

According to an embodiment, at least one (e.g., a first antenna module 130a) of the antenna modules 130 may be disposed in a face of the electronic device 101 that is flush with the display face of the display 110. FIG. 1 illustrates an example where each of first to fourth antenna modules (130a to 130d) is disposed adjacent to a corner of the electronic device 101 is illustrated. The disclosure is not limited thereto.

The communication circuit 140 may process a signal transmitted and received via the antenna module 130. The communication circuit 140 may operate the antenna module 130 under control of the processor 150. The communication circuit 140 may transmit the signal received via the antenna module 130 to the processor 150. For example, the communication circuit 140 may include a communication interface for the antenna module 130 and a communication processor (CP).

The processor 150 may perform various computations required for the operation of the electronic device 101. The processor 150 may transmit a control signal to various elements inside the electronic device 101 and may receive a result according to the control signal.

According to one embodiment, the processor 150 may determine wave characteristics of the millimeter-wave signal output via the antenna module 130. For example, to recognize the external object using the wave characteristic of the millimeter-wave signal, the processor 150 may determine the output intensity, the output direction, and the beam width of the millimeter-wave signal output via the antenna module 130.

According to one embodiment, the processor 150 may recognize the external object based on the signal received via the antenna module 130. For example, the processor 150 may recognize the user's face or facial expression, or a gesture created by the user's fingers based on the signal received via the antenna module 130. The processor 150 may use the recognized information in various applications.

The memory 160 may store therein various information required for the operation of the electronic device 101. For example, the memory 160 may store therein reference information related to the recognition of the external object. The processor 150 may determine that user authentication has been completed when information about a major feature (landmark) (e.g., eyes, nose, or mouth) of the external object (e.g., face) matches the information stored in the memory 160.

The camera 170 may include an image sensor. The camera 170 may generate image data using light reflected from the external object.

According to various other embodiments, the electronic device 101 may further include additional sensors (or sensor modules) not shown. The processor 150 may control the antenna module 130 based on information collected via the sensors. For example, the sensors may include a luminance sensor. In this case, the processor 150 may activate the antenna module 130 to recognize the object when ambient brightness detected via the luminance sensor is greater than or equal to a specified value. In another example, the sensors may include a proximity sensor. In this case, when the processor 150 has determined, using the proximity sensor, that the user is in proximity to the electronic device 101 or is holding the electronic device 101, the processor 150 may activate the antenna module 130 to recognize the object.

Figure 2A:
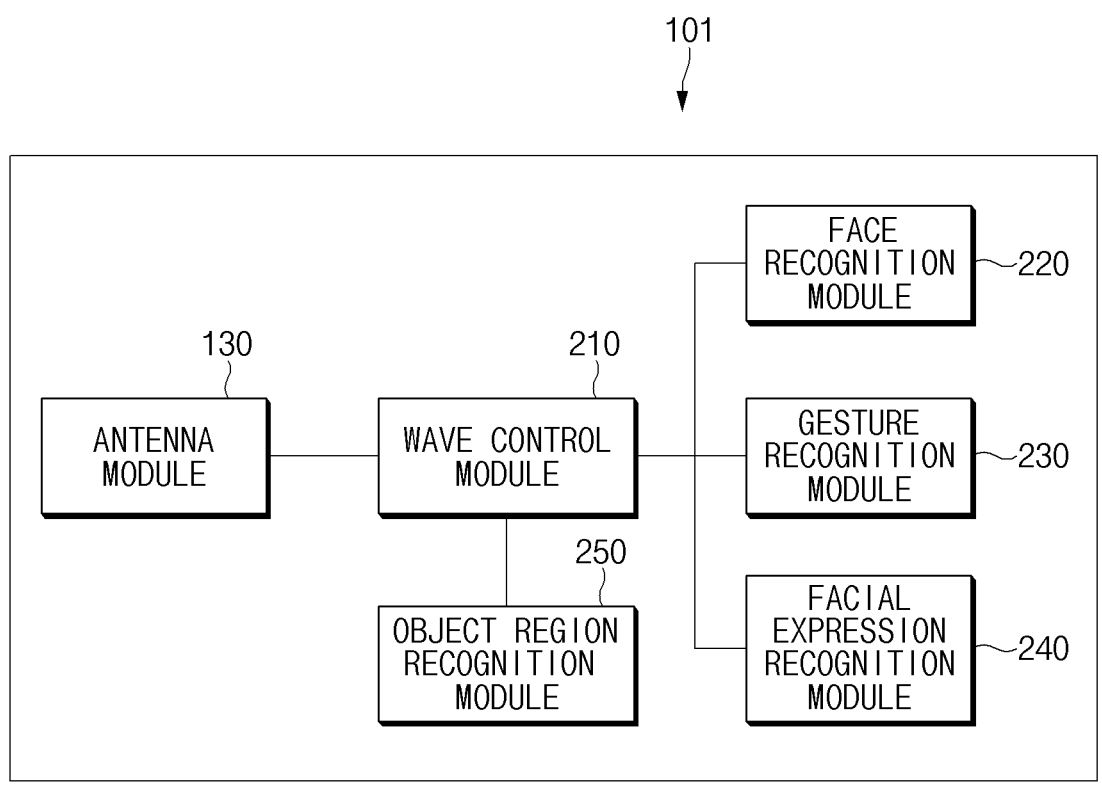
FIG. 2A is a configuration diagram of modules for recognizing an object using millimeter-wave according to an embodiment.

FIG. 2A is a configuration diagram of modules for recognizing an object using millimeter-wave according to an embodiment.

Referring to FIG. 2A, the electronic device 101 may include the antenna module 130, a wave control module 210, a face recognition module 220, a gesture recognition module 230, a facial expression recognition module 240, and an object region recognition module 250.

The antenna module 130 may include components necessary to emit and receive millimeter-wave. For example, the antenna module 130 may include an antenna, an RF circuit, or a base band chipset.

The wave control module 210 may change the wave characteristics of the millimeter-wave signal output via the antenna module 130. The wave characteristic may be various characteristics such as the output intensity, the output direction, or the beam width of the outputted millimeter-wave signal.

The face recognition module 220 may recognize the user's face using a reflection pattern generated from the millimeter-wave signal reflected from the external object. For example, the face recognition module 220 may extract feature information of major features (e.g., eyes, nose, or mouth) of the user's face from the reflection pattern. The face recognition module 220 may perform user authentication based on a comparison between the extracted information and pre-stored reference information.

According to one embodiment, the face recognition module 220 may recognize the user's face using reflection patterns of first beams and second beams having different beam widths.

The gesture recognition module 230 may recognize the user's gesture (e.g., finger movement) using the reflection pattern generated from the millimeter-wave signal reflected from the external object. For example, the gesture recognition module 230 may analyze a change direction or a change amount of a gesture based on the reflection pattern and determine whether the gesture matches a pre-stored reference gesture. When the user's face authentication via the face recognition module 220 has been completed, the gesture recognition module 230 may perform the process of recognizing the user's gesture.

According to one embodiment, the gesture recognition module 230 may recognize the user's gesture using the reflection pattern of first beams and second beams having different beam widths.

The facial expression recognition module 240 may recognize the user's facial expression (e.g., laughing, annoyed, angry or crying) using the reflection pattern generated from the millimeter-wave signal reflected from the user's face. For example, the facial expression recognition module 240 may analyze a change direction or a change amount of a major feature (landmark) in the user's face based on the reflection pattern, and determine a percentage by which the facial expression matches pre-stored reference information. When the user's face authentication via the face recognition module 220 has been completed, the facial expression recognition module 240 may perform a process of recognizing the user's facial expression.

The object region recognition module 250 may analyze a reflection pattern of the first beams having a relatively thick beam width and determine a region in which each of external objects (e.g., face or hand) is disposed. When viewed from the electronic device 101, the external objects may be arranged separately from each other, and some or all thereof may be arranged in an overlapping state. For example, the object region recognition module 250 may determine a region in which a face or a hand is disposed based on comparing the time of flight (TOF) values of various first beams having relatively large beam width.

Each of the modules in FIG. 2A may be implemented in software or hardware within the electronic device 101. The modules in FIG. 2A are distinguished from each other according to their functions. The disclosure is not limited thereto. According to one embodiment, operations of the wave control module 210, the face recognition module 220, the gesture recognition module 230, the facial expression recognition module 240, and the object region recognition module 250 may be performed by the processor 150 in FIG. 1.

Figure 2B:
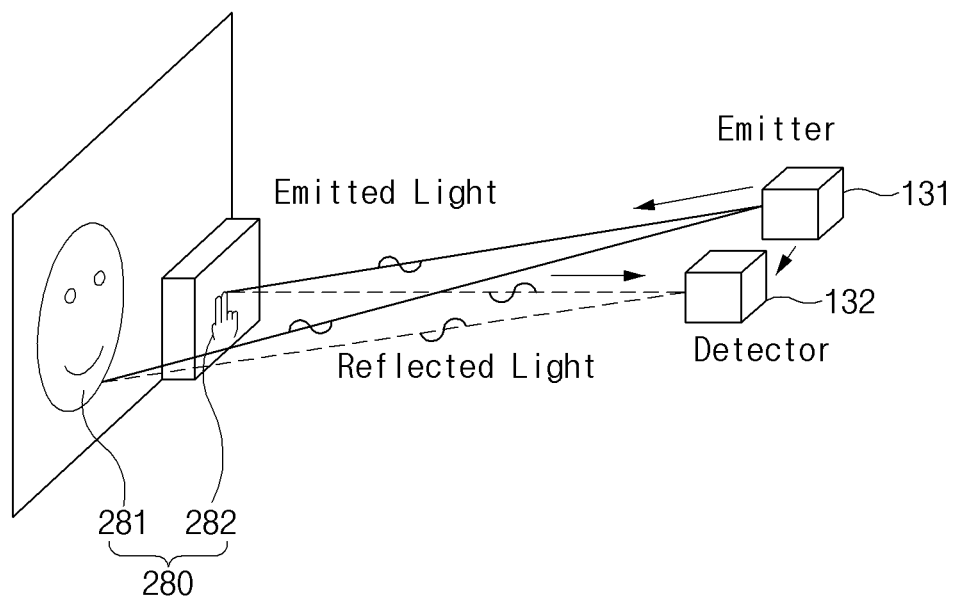
FIG. 2B shows a configuration of an antenna module according to an embodiment and transmission characteristics of millimeter-wave of the antenna module.

FIG. 2B shows a configuration of an antenna module according to an embodiment and transmission characteristics of millimeter-wave thereof.

Referring to FIG. 2B, the antenna module 130 may include an emitter 131 and a detector 132.

The emitter 131 may output millimeter-wave in a front direction of the electronic device 101. The millimeter-wave emitted from the emitter 131 may have directional characteristics and may have a specified beam width.

According to one embodiment, the emitter 131 may emit millimeter-wave according to a control signal of the communication circuit 140 or the processor 150. An output direction (e.g., azimuth, and/or elevation) of the millimeter-wave emitted from the emitter 131 may be determined according to the control signal.

According to one embodiment, the emitter 131 may emit a first beam and/or a second beam having different beam widths. A signal generated from the first beams reflected from an external object 280 may be used to determine the region in which the external object 280 is placed. For example, the first beams may be used to recognize a feature (object type, or major feature) of the external object 280.

The detector 132 may receive a millimeter-wave signal reflected from the external object 280. The millimeter-wave signal received via the detector 132 may be provided to the processor 150 which may use the same to recognize the external object 280.

For example, the emitter 131 may output the first beams having a first beam width to a first object 281 and a second object 282, which are contained in a specified spatial range. Each of the first object 281 and the second object 282 may reflect the first beams. The first object 281 and the second object 282 may be disposed at different distances from the electronic device 101 and may have different reflection characteristics. The detector 132 may receive a first reflection pattern as a collection of the first beams reflected from the first object 281 and the second object 282. The detector 132 may transmit the received first reflection pattern to the processor 150 inside the electronic device 101. The processor 150 may classify and analyze the first reflection pattern, and may separate patterns of signal respectively reflected from the first object 281 and the second object 282 disposed at different distances from the electronic device 101 from each other.

After receiving the first reflection pattern of the first beams, the emitter 131 may output the second beams having a second beam width smaller than the first beam width. The detector 132 may receive a second reflection pattern as a collection of the second beams reflected from the first object 281 or the second object 282. The detector 132 may transmit the received second reflection pattern to the processor 150 inside the electronic device 101. The processor 150 may analyze the second reflection pattern to recognize state information or gesture information of the first object 281 or the second object 282.

Figure 3:
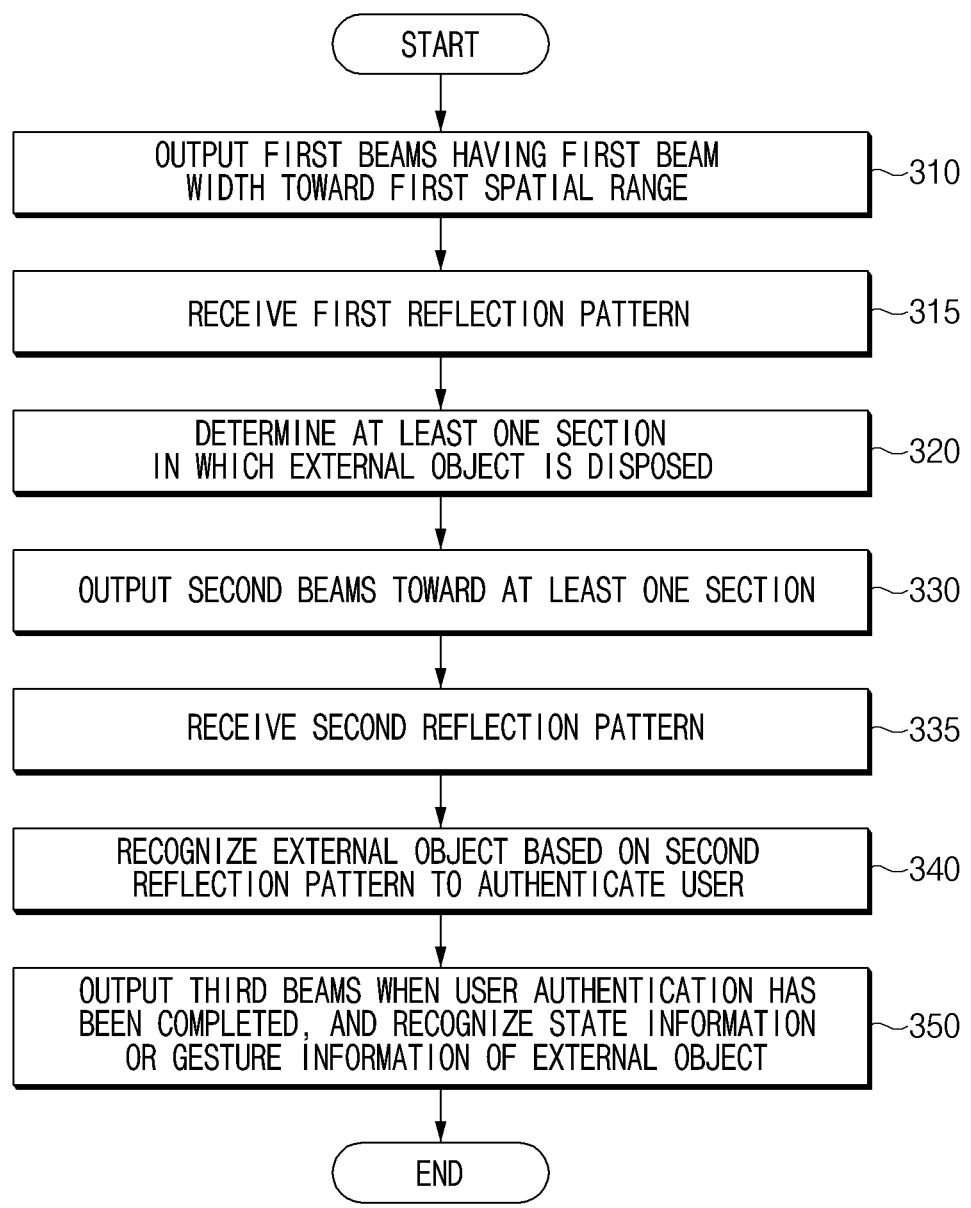
FIG. 3 is a flowchart illustrating an object recognition method using millimeter-wave according to an embodiment.

FIG. 3 is a flowchart illustrating an object recognition method using millimeter-wave according to an embodiment.

Referring to FIG. 3, in operation 310, the processor 150 may control the emitter 131 of the antenna module 130 to output the first beams having the first beam width toward the first spatial range (or output spatial range or beam forming angle) around the electronic device 101. The first spatial range may be determined according to device characteristics or settings of the antenna module 130.

According to one embodiment, the first spatial range may be predetermined. For example, the first spatial range may be determined as a spatial range corresponding to a field of view (FOV) of 45 degrees in a vertical direction and 45 degrees in a horizontal direction around the center of the front face of the electronic device 101.

According to another embodiment, the first spatial range may be determined based on a FOV of the camera 170. The processor 150 may determine the output intensity, the beam width, the output direction, or the output angle of the first beams, based on the FOV of the camera 170 (see FIG. 5).

In operation 315, the detector 132 of the antenna module 130 may receive the first reflection pattern as a collection of the first beams reflected from the external object 280. For example, the external object 280 may be the user's face or hand. The number of the external objects 280 may be plural. For example, the external object 280 may include the user's face and hands.

In operation 320, the processor 150 may determine at least one section in which the external object 280 is disposed among a plurality of sections constituting the first spatial range, based on the first reflection pattern. The processor 150 may determine a section in which the external object 280 from which the first beams are reflected is disposed, based on a signal feature (e.g., phase, time of flight, or amplitude) of the first reflection pattern.

For example, the processor 150 may determine a section containing the external object 280 based on a time of flight (TOF) value. The TOF (time of flight) value in a section in which external object 280 is disposed may be relatively small, while the TOF value in a section in which the external object 280 is not disposed may be relatively large. When a plurality of external objects are disposed in the first spatial range, the TOF value of an object disposed relatively closer to the electronic device 101 may be smaller than the TOF value of another object far away from the electronic device 101. Accordingly TOF value may be referred to as depth information.

In operation 330, the processor 150 may control the emitter 131 of the antenna module 130 to output the second beams having the second beam width smaller than the first beam width to at least one section where the external object 280 is disposed.

According to one embodiment, the processor 150 may divide each section in which the external object 280 is disposed into a plurality of sub-sections, and may control the emitter 131 of the antenna module 130 to output the second beams to each sub-section.

In operation 335, the detector 132 of the antenna module 130 may receive the second reflection pattern as a collection of the second beams reflected from the external object 280.

In operation 340, the processor 150 may recognize the external object 280 based on the second reflection pattern to authenticate the user. For example, the external object 280 may include the user's face. In this case, the processor 150 may perform the user face authentication based on the second reflection pattern. The processor 150 may compare the second reflection pattern (or information into which the second reflection pattern is converted) with face authentication information pre-stored in the memory 160.

According to an embodiment, the processor 150 may perform liveness detection prior to the face authentication process, or may simultaneously perform the liveness detection and the face authentication process. The processor 150 may analyze a detailed change amount related to at least a portion of the second reflection pattern for liveness detection. The processor 150 may control the emitter to repeatedly emit the second beams to sub-sections containing major features or landmarks of the face.

According to an embodiment, the processor 150 may terminate the object recognition process when the user (e.g., face) authentication is not performed. Alternatively, the processor 150 may notify the user of face authentication failure using user notification (e.g., a pop-up notification, or a sound notification).

In operation 350, the processor 150 may control the emitter of the antenna module 130 to output third beams when the user (e.g., face) authentication has been completed, in order to recognize state information or gesture information of the external object 280. The third beams may be the same as the second beams or may be another millimeter-wave signal having a third beam width which is smaller than the second beam width.

In one example, when the external object 280 includes the user's face, the state information may be information obtained by analyzing the user's facial expression.

In another example, when the external object 280 includes the user's face and hands, the state information may be information obtained by analyzing the user's facial expression, and the gesture information may be information about a movement pattern of the user's hand.

According to an embodiment, the processor 150 may extend the region into which the third beams are output beyond the region into which the second beams are output. For example, when the external object 280 includes a gesture-related object (e.g., hand), the movement range of the object may be larger than the region into which the second beams are output, and accordingly, the region in which object recognition should be performed may also be larger. The processor 150 may increase recognition effectiveness by expanding the region into the third beams are output beyond the region into the second beams are output.

According to an embodiment, the processor 150 may execute an application based on the recognized state information or gesture information. For example, the processor 150 may output a response corresponding to the recognized facial expression of the user or execute a function corresponding to the user's gesture.

Figure 4:
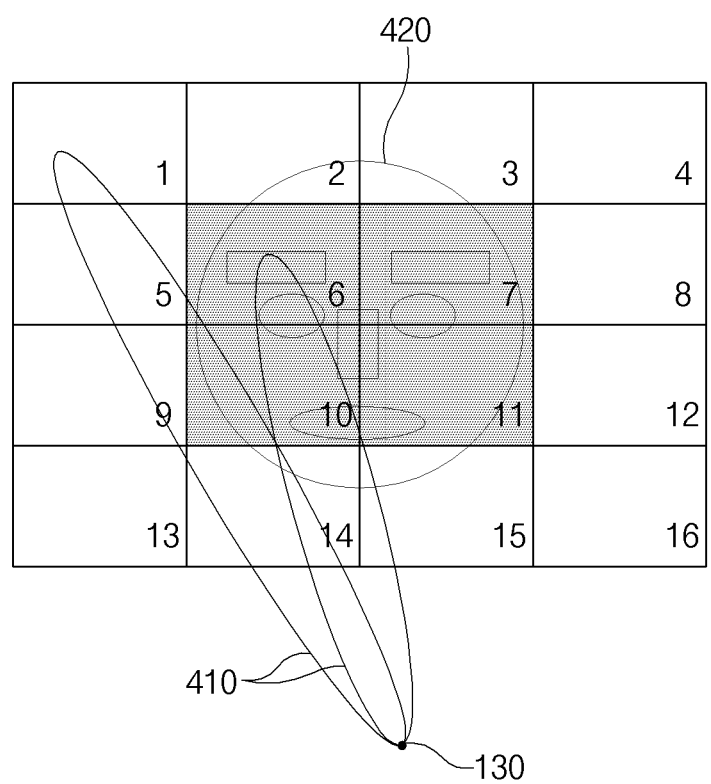
FIG. 4 shows an output of first beams toward a first spatial range according to an embodiment.

FIG. 4 shows output of the first beams toward the first spatial range according to an embodiment.

Referring to FIG. 4, the processor 150 may divide the first spatial range into a plurality of sections (e.g., 16 sections in FIG. 4), and may control the antenna module 130 to output first beams 410 to a space corresponding to each section. The processor 150 may determine the section in which the user's face (hereinafter, facial object) 420 is disposed, based on the pattern of the wave reflected from the object in various sections.

For example, the section in which the user's facial object 420 is located may have a smaller emission-reflection-reception time (time of flight (TOF)) value of the reflected wave. The processor 150 may determine the section in which the facial object 420 is located, based on the TOF value. In the example shown in FIG. 4, the processor 150 may determine that the second section, the third section, the sixth section, the seventh section, the tenth section, the eleventh section, the fourteenth section, and the fifteenth section together are the section containing the facial object 420.

According to an embodiment, the processor 150 may change the number of sections constituting the first spatial range by adjusting the beam width of the first beams output via the antenna module 130. For example, as shown in FIG. 4, the processor 150 may control the antenna module 130 to adjust the beam width of the first beams so that the first spatial range may be divided into 16 sections. In another example, the processor 150 may control the antenna module 130 to double the beam width of the first beams so that the same spatial range is divided into 8 sections.

Figure 5:
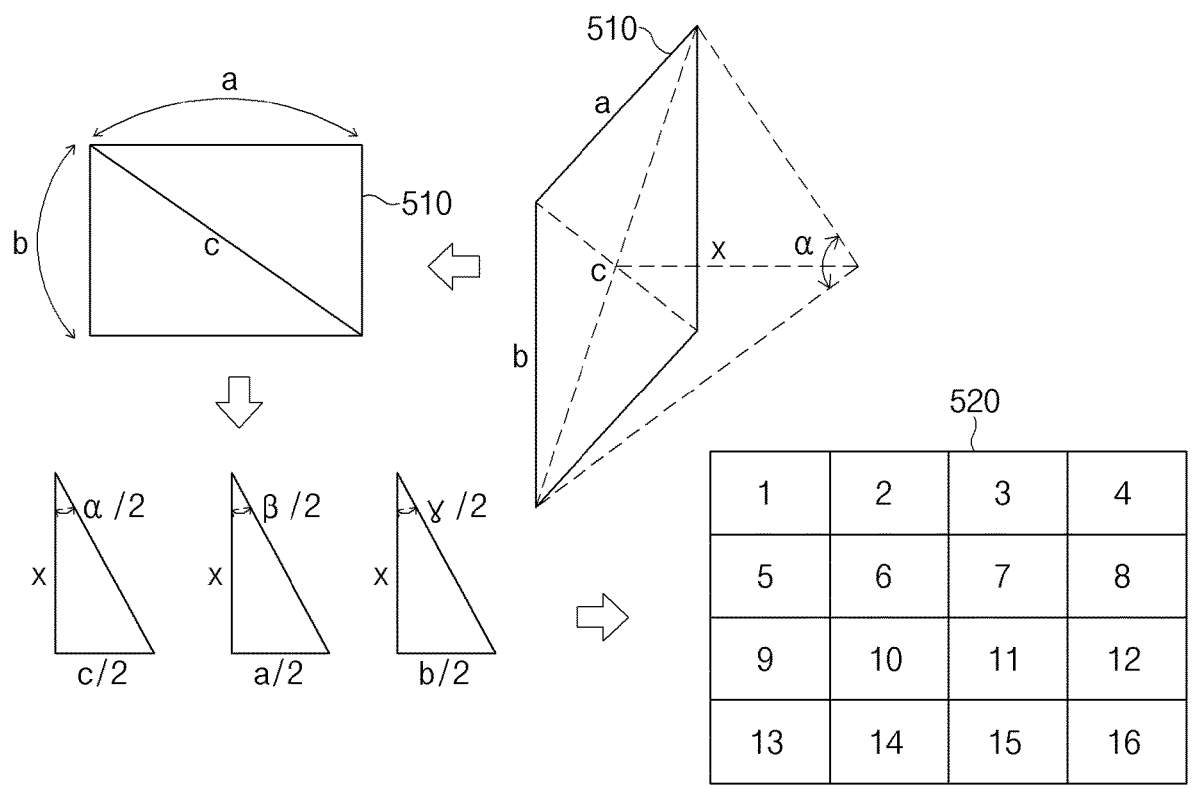
FIG. 5 shows determination of a spatial range into which the first beams are output, based on a field of view (FOV) of a camera according to an embodiment.

FIG. 5 shows determination of a spatial range into which the first beams are output, based on the FOV of the camera according to an embodiment.

Referring to FIG. 5, the processor 150 may divide the first spatial range into a plurality of sections, based on the FOV of the camera 170. The processor 150 may control the antenna module 130 to output the first beams to each of the plurality of sections determined based on an aspect ratio and the FOV of the camera.

For example, the processor 150 may determine the output direction of the first beams, based on an image (hereinafter, captured image) 510 received via the camera 170. In the captured image 510 from the camera 170, the user's face may be contained in a portion thereof p "a" and "b" in FIG. 5 may refer to the aspect ratio of the captured image 510 from the camera 170. α may be the FOV of the camera 170. The FOV may be defined as the angle between diagonal edges of the captured image. The processor 150 may calculate a camera angle in the direction of a line segment "a" and a camera angle in the direction of a line segment "b".

According to one embodiment, the processor 150 may calculate the first spatial range based on the maximum FOV of the camera, in a state when the distance to the external object is not calculated.

The processor 150 may calculate the camera angle in the direction of the line segment "a," and the camera angle in the direction of the line segment "b," based on a following equation.

The camera angle $\beta$ in the direction of the line segment "a" may be calculated as follows:

$$\beta = \tan^{-1} \frac{a \tan \frac{\alpha}{2}}{\sqrt{a^2 + b^2}}$$

The camera angle $\gamma$ in the direction of the line segment "b" may be calculated as follows:

$$\gamma = \tan^{-1} \frac{b \tan \frac{\alpha}{2}}{\sqrt{a^2 + b^2}}$$

The processor 150 may divide each of $\beta$ and $\gamma$ by the number (e.g., 16) of the sections of a first spatial range 520 to determine the direction of the beam corresponding to each section.

For example, when the first spatial range is divided into 16 sections, a first section may correspond to $$\left(\frac{\beta}{4} \sim \frac{\beta}{2}, \frac{\gamma}{4} \sim \frac{\gamma}{2}\right),$$

while the second section may correspond to $$\left(\frac{\beta}{2} \sim \frac{3\beta}{4}, \frac{\gamma}{4} \sim \frac{\gamma}{2}\right).$$

According to an embodiment, the processor 150 may calculate the distance to the object, based on the TOF value in the section in which the object is disposed. When the distance to the object is not recognized, the processor 150 may control the antenna module 130 to output the first beams such that the first beams travel to infinity. Alternatively, the processor 150 may control the antenna module 130 to output the first beams such that the width of each of the first beams is inversely proportional to the distance.

Figure 6:
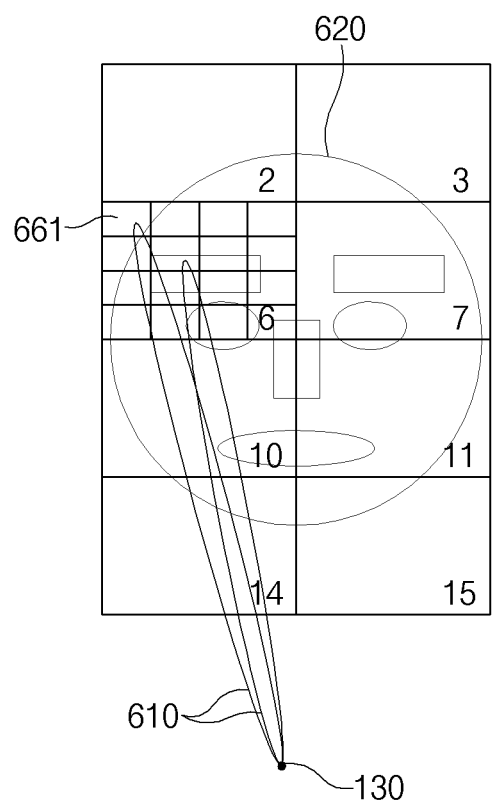
FIG. 6 shows an output of second beams according to an embodiment.

FIG. 6 shows output of the second beams according to an embodiment.

Referring to FIG. 6, the processor 150 may control the antenna module 130 to output second beams 610 to sections where an object 620 is disposed, based on the first reflection pattern of the first beams 410. The second beams 610 may have a smaller beam width than that of each of the first beams 410. The processor 150 may divide each of the second section, the third section, the sixth section, the seventh section, the tenth section, the eleventh section, the fourteenth section and the fifteenth section in which the object 620 is disposed into sub-sections 661, and may control the antenna module 130 to output the second beams 610 thereto. FIG. 6 shows a case in which the sixth section is divided into the sub-sections by way of example. The disclosure is not limited thereto.

The processor 150 may control the antenna module 130 to output the second beams 610 not on the basis of the pixels of the captured image, but on the basis of the sub-sections. For example, the processor 150 may control the antenna module 130 to output the second beams 610 having a beam width of about 3 to 3.56 Ghz. The resolution measurable using the reflected wave of the second beams 610 having that beam width may be about 100 μm. The processor 150 may collect information (e.g., depth information) about the external object 620 from the reflected wave of the second beams 610.

According to an embodiment, the processor 150 may control the antenna module 130 to change the beam width of each of the second beams 610 and in turn change the size of the sub-section. For example, when collecting high security level data or performing liveness detection of the user face, the processor 150 may control the antenna module 130 so that the beam width is relatively small to increase the resolution of the reflection pattern of the second beams. In another example, when collecting information about the approximate shape of the object, the processor 150 may control the antenna module 130 so that the beam width is relatively larger (but is smaller than that of each of the first beams) to decrease the resolution of the reflection pattern of the second beams.

According to an embodiment, the processor 150 may control the antenna module 130 to emit the second beams 610 several times to detect detailed changes in the face. Alternatively, the processor 150 may control the antenna module 130 to adjust the beam width of each of the second beams 610 to be smaller and to emit the beams toward the major landmark features of the face (e.g., eyes, nose or mouth). The processor 150 may perform machine learning-based face authentication, based on the corresponding reflection pattern of the second beams.

Figure 7:
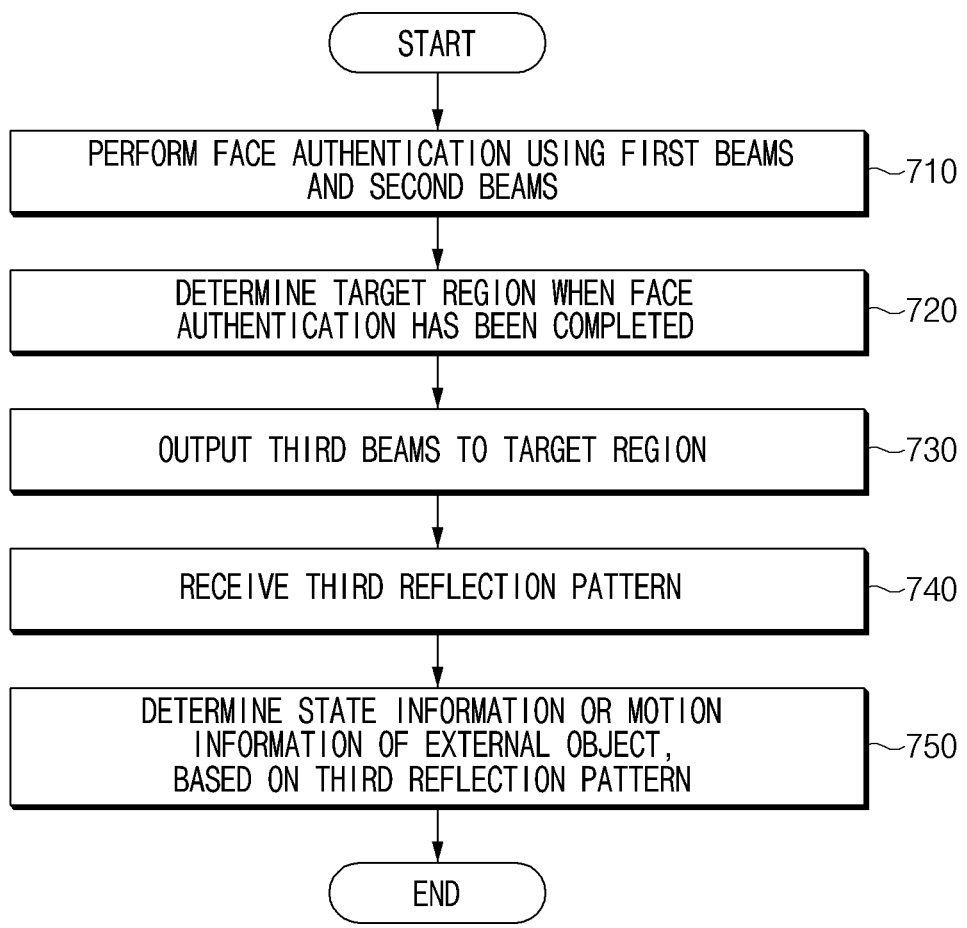
FIG. 7 is a flowchart illustrating a method for performing face recognition, and then, gesture or facial expression recognition according to an embodiment.

FIG. 7 is a flowchart illustrating a method for performing face recognition, and then, gesture or facial expression recognition according to an embodiment.

Referring to FIG. 7, in operation 710, the processor 150 may perform face authentication using the reflection pattern of the first beams and the second beams received via the antenna module 130. The processor 150 may authenticate the user's face via operations corresponding to operations 310 to 340 in FIG. 3.

In operation 720, when the face authentication has been completed, the processor 150 may determine a target region for obtaining additional information, based on the first reflection pattern or the second reflection pattern received via the antenna module 130. The target region may refer to a region in the first spatial range to which the antenna module 130 outputs additional millimeter-wave in order to obtain additional information for object recognition.

For example, the target region may include a region containing a gesture-related object or a region that extends beyond the section containing the gesture-related object. In another example, the region to which the third beams are output may be a region in which a major feature (landmark) of a facial object is disposed or a region which extends beyond the section in which the major feature (landmark) is disposed.

In operation 730, the processor 150 may control the emitter 131 of the antenna module 130 to output the third beams to the target region. The third beams may have the same width as that of the second beam or have a third beam width smaller than the beam width of the second beam.

In operation 740, the detector 132 of the antenna module 130 may receive the third reflection pattern as a collection of the third beams reflected from the external object 280.

In operation 750, the processor 150 may determine the state information or motion information of the external object 280, based on the third reflection pattern received via the detector 132 of the antenna module 130. For example, the state information may include facial expression information (e.g., laughter, anger, sadness, or crying) of the user face. In another example, the motion information may include information regarding a gesture in which the user moves a hand or finger.

Figure 8:
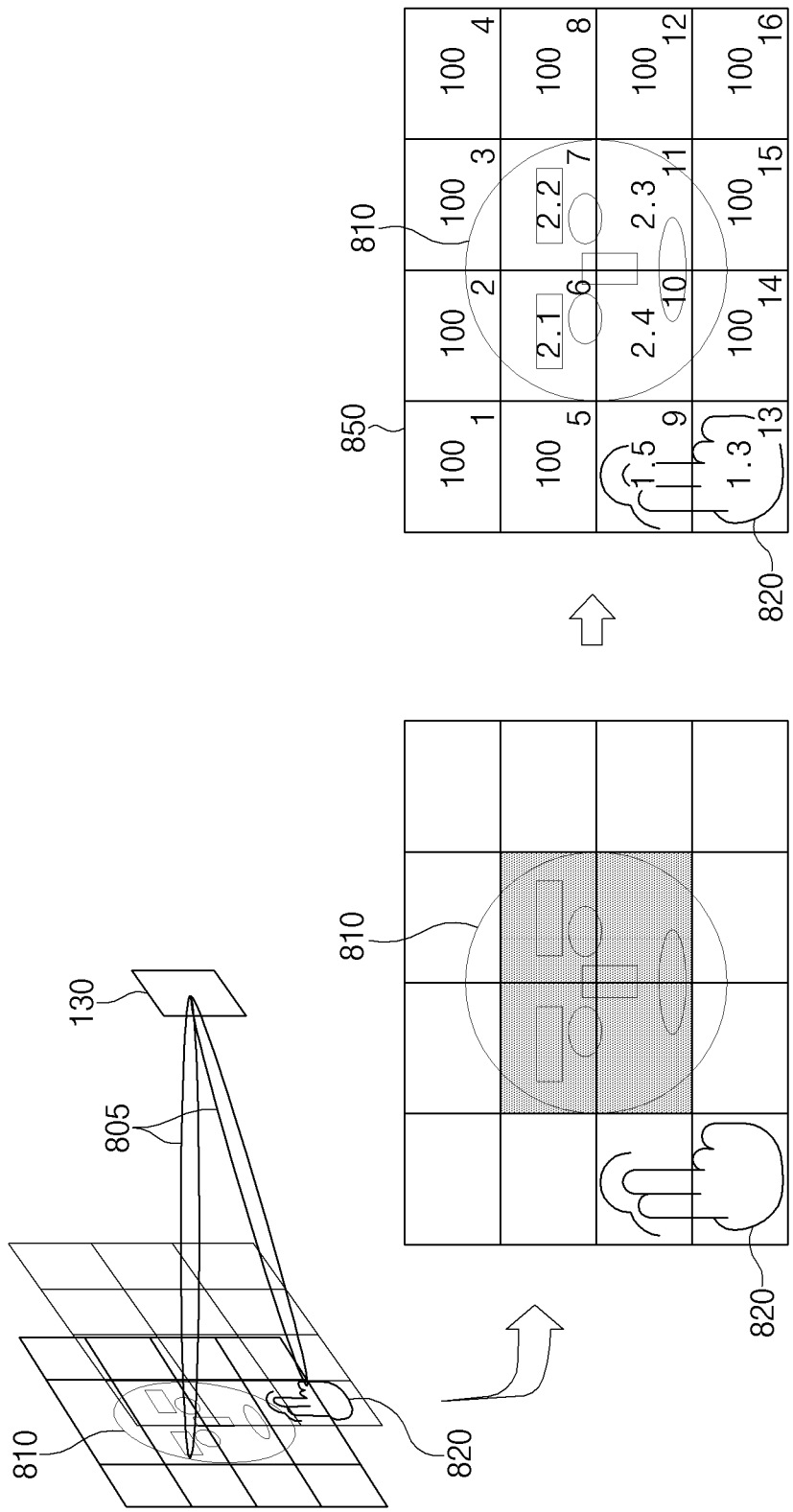
FIG. 8 is an exemplary view of a case where a facial object and a gesture-related object are contained in the same spatial range according to an embodiment.

FIG. 8 is an exemplary view when the facial object and the gesture-related object are contained in the same spatial range according to an embodiment.

Referring to FIG. 8, the processor 150 may control the antenna module to emit first beams 805 having the first beam width to a designated first spatial range.

In following descriptions, an example in which a facial object 810 and a gesture-related object 820 are contained in the first spatial range will be described. The disclosure is not limited thereto.

The facial object 810 and the gesture-related object 820 may be disposed at different distances from the electronic device 101. Depending on the distance differences, a difference between depths of waves respectively reflected from the facial object 810 and the gesture-related object 820 may occur.

The processor 150 may control the detector 132 of the antenna module 130 to collect reflection patterns of the first beams 805 reflected from the respective objects. The processor 150 may compare and analyze the reflection patterns to determine a section in which the facial object 810 is disposed and a section in which the gesture-related object 820 is disposed. For example, the TOF values of the reflection patterns of the first beams 805 in a TOF map 850 may be compared with each other. In connection to this, the region where the TOF value is within a certain variance may be determined as the region where one object is disposed.

According to an embodiment, the processor may perform clustering according to the number of specific objects, using, for example, a k-means method.

According to an embodiment, the processor 150 may use a clustering method based on unsupervised learning when the number of the objects are limited.

In this example, the processor 150 may determine each of the sixth section, the seventh section, the tenth section, and the eleventh section having a TOF value in the range of 2.0 to 2.5 in the TOF map 850 as the region in which the facial object 810 is disposed. The processor 150 may determine each of the ninth section and the thirteenth section having a TOF value in the range of 1.0 to 2.0 as the region in which the gesture-related object 820 is disposed. The processor 150 may determine that remaining sections do not contain an object within a specified distance, or may determine the remaining sections as a region where object recognition is not possible.

Figure 9:
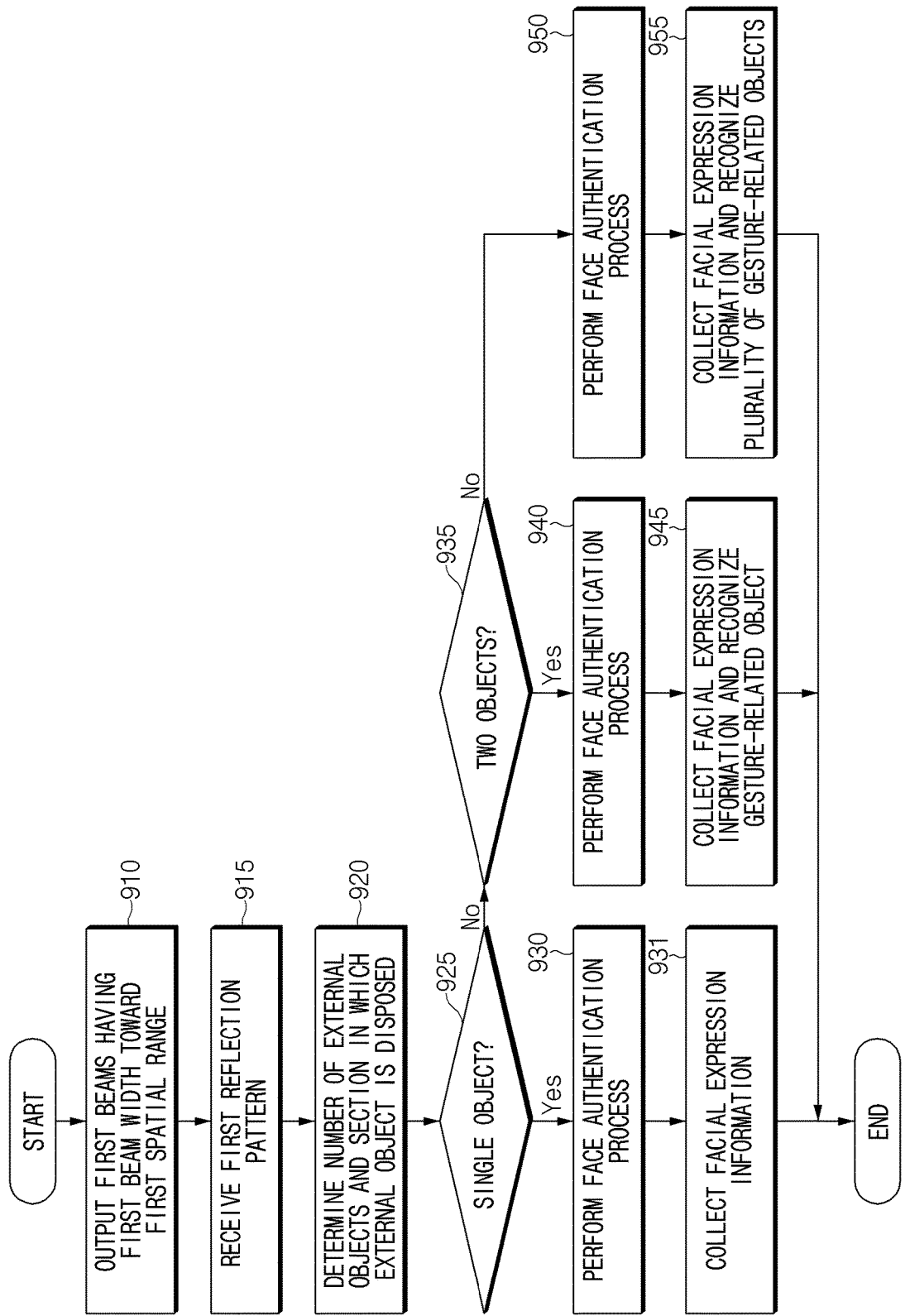
FIG. 9 is a flowchart regarding an object recognition method when a plurality of objects are contained in a first spatial range according to an embodiment.

FIG. 9 is a flowchart regarding an object recognition method when a plurality of objects are contained in the first spatial range according to an embodiment.

Referring to FIG. 9, in operation 910, the processor 150 may control the emitter 131 of the antenna module 130 to output the first beams having the first beam width toward the first spatial range (or output range) around the electronic device 101.

In operation 915, the detector 132 of the antenna module 130 may receive the first reflection pattern of the first beams reflected from the external object 280.

In operation 920, the processor 150 may determine the number of the external objects 280 contained in the first spatial range, and the section(s) in which the external object 280 is disposed, based on the first reflection pattern received via the detector 132. The first reflection pattern may include depth information about the external object 280 contained in the first spatial range. The processor 150 may determine the number of the external objects 280 contained in the first spatial range and the section in which each object is disposed, based on the depth information.

In operation 925, the processor 150 may check whether one object is contained in the first spatial range, based on the first reflection pattern.

In operation 930, when one object is contained in the first spatial range, the processor 150 may determine that the facial object is contained therein and may perform face authentication. The processor 150 may control the antenna module 130 to output the second beams to perform face authentication.

In operation 931, when the user authentication has been completed, the processor 150 may control the antenna module 130 to output the third beams to collect facial expression information of the user face.

In operation 935, the processor 150 may check whether two objects are contained in the first spatial range, based on the first reflection pattern.

In operation 940, when the two objects are contained in the first spatial range, the processor 150 may determine that one facial object and one gesture-related object are contained therein and may perform face authentication. The processor 150 may control the antenna module 130 to output the second beams to perform face authentication.

In one embodiment, the processor 150 may determine that the object having the larger depth is the facial object.

In operation 945, when the user authentication has been completed, the processor 150 may control the antenna module 130 to output the third beams to collect facial expression information of the user's face, or to recognize a gesture of a gesture-related object.

In operation 950, when three or more objects are contained in the first spatial range, the processor 150 may determine that one facial object and a plurality of gesture-related objects are contained therein and may perform face authentication. The processor 150 may control the antenna module 130 to output the second beams to perform face authentication. In one embodiment, the processor 150 may determine that the object having the largest depth is the facial object.

In operation 955, when the user authentication has been completed, the processor 150 may control the antenna module 130 to output the third beams to collect facial expression information of the user face, or to recognize a gesture of each of the plurality of gesture-related objects. For example, the processor 150 may control the antenna module 130 to output the third beams toward the facial object to determine the facial expression (e.g., laughter, crying, sadness or angry) of the facial object. The processor 150 may control the antenna module 130 to output the third beams toward each gesture-related object and then may determine that a first gesture related to a first gesture-related object (e.g. hand waving) and a second gesture related to a second gesture-related object (e.g. clenched fist).

Figure 10:
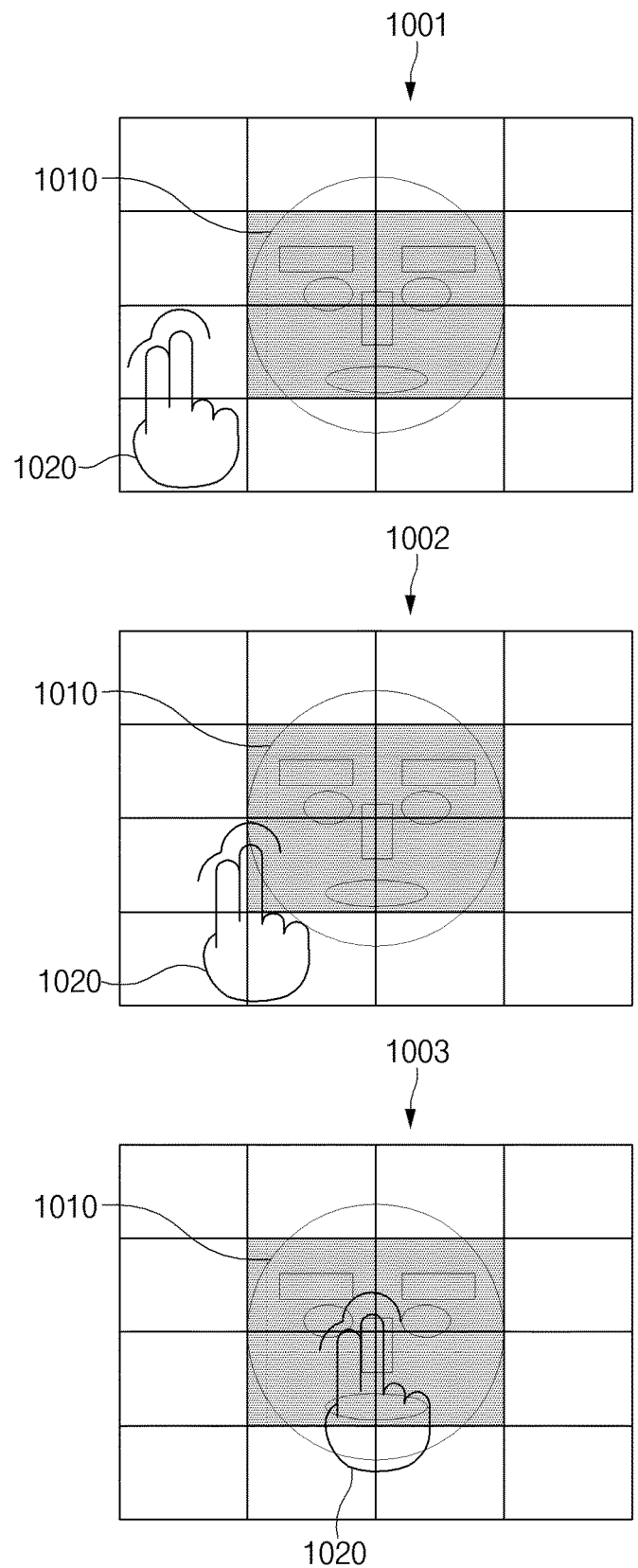
FIG. 10 is an exemplary diagram showing processing of an overlapping state between objects according to an embodiment.

FIG. 10 is an exemplary diagram showing processing of an overlapping state between objects according to an embodiment.

Referring to FIG. 10, when a plurality of objects are contained in the first spatial range, the plurality of objects may not overlap each other, or may at least partially overlap each other.

In FIG. 10, an example in which a facial object 1010 and a gesture-related object 1020 overlapping each other is shown. The disclosure is not limited thereto.

In the first state 1001, the facial object 1010 and the gesture-related object 1020 may not overlap each other. The processor 150 may control the antenna module 130 to output the first beams to determine the regions in which the objects are disposed. The processor 150 may control the antenna module 130 to output the second beams to the regions where the objects are disposed to recognize each object. For example, the processor 150 may authenticate the facial object 1010 and then may recognize the gesture-related object 1020.

In the second state 1002, the facial object 1010 may partially overlap the gesture-related object 1020. The processor 150 may control the antenna module 130 to output the first beams to determine a region in which each object is disposed. The processor 150 may recognize a state in which the facial object 1010 and the gesture-related object 1020 partially overlap each other, based on the difference between depths of the reflection patterns thereof. The processor 150 may control the antenna module 130 to output the second beams to the region where each object is disposed. For example, when the gesture-related object 1020 does not cover a major feature (landmark) (e.g., eyes, nose, or mouth) of the facial object 1010, the processor 150 may authenticate the facial object 1010 and then may recognize the gesture-related object 1020.

In the third state 1003, the facial object 1010 and the gesture-related object 1020 may substantially overlap each other so that the gesture-related object 1020 may be contained in the facial object 1010. The processor 150 may control the antenna module 130 to output the first beams and may determine that the facial object 1010 and the gesture-related object 1020 substantially overlap each other. The processor 150 may control the antenna module 130 to output the second beams to the region where the facial object 1010 is disposed. When it is determined that the gesture-related object 1020 covers a major feature (landmark) (e.g., eyes, nose, or mouth) of the facial object 1010, the processor 150 may report authentication failure of the facial object 1010 to the user.

According to an embodiment, when it is determined that the gesture-related object 1020 covers a major feature (landmark) (e.g., eyes, nose, mouth) of the facial object 1010, the processor 150 may determine a portion (e.g., eye or eyebrow) of the major feature (landmark) (e.g., eyes, nose, or mouth) of the facial object 1010 which is not covered with the gesture-related object 1020. The processor 150 may control the antenna module 130 to output the second beams to the portion (e.g., eyes or eyebrows) that is not covered with the gesture-related object 1020. When the face authentication is successful based on the portion (e.g., eye or eyebrow) that is not covered with the gesture-related object 1020, the processor 150 may recognize the gesture-related object 1020. According to an embodiment, when it is determined that the gesture-related object 1020 covers the major feature (landmark) (e.g., eyes, nose, or mouth) of the facial object 1010, the processor 150 may wait for a predetermined time duration. After the predetermined time duration has lapsed, the gesture-related object 1020 may not cover the major feature (landmark) (e.g., eyes, nose, or mouth) of the facial object 1010. In this case, the processor 150 may perform the face authentication. Otherwise, after the predetermined time duration has lapsed, and the gesture-related object 1020 may still be covering the major feature (landmark) (e.g., eyes, nose, or mouth) of the facial object 1010. In this case, the processor 150 may notify the user of the authentication failure. According to one embodiment, the processor 150 may provide the user with a guide to remove the gesture-related object 1020 that covers the major feature (landmark) (e.g., eyes, nose, or mouth) of the facial object 1010 for authentication. For example, the processor 150 may output a text or a voice such as "Please remove your hand from your face for authentication".

Figure 11:
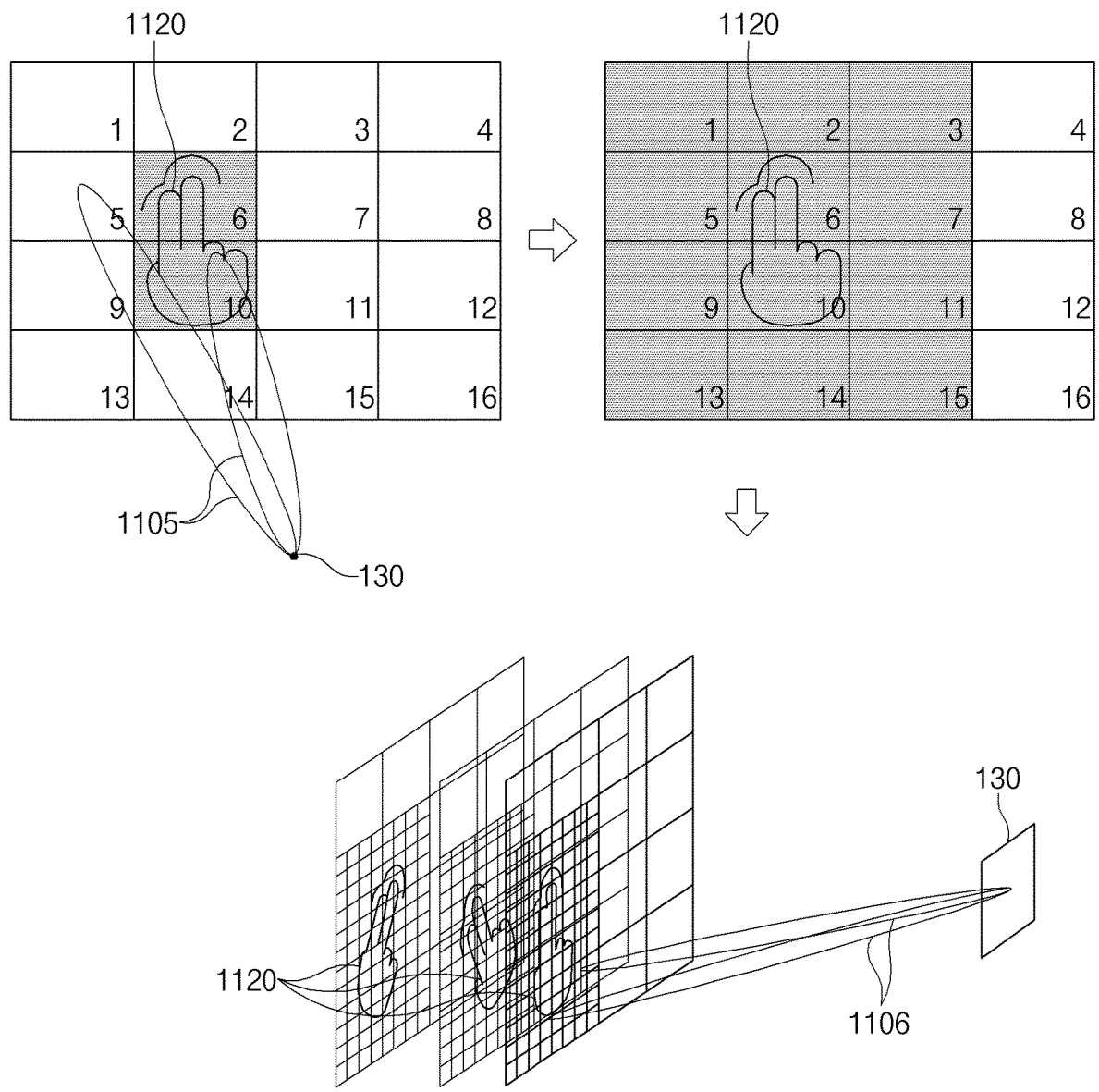
FIG. 11 is an exemplary diagram showing recognition of a gesture-related object after face authentication according to an embodiment.

FIG. 11 is an exemplary diagram showing recognition of a gesture-related object after face authentication according to an embodiment.

Referring to FIG. 11, after the face authentication has been completed, the processor 150 may control the antenna module 130 to output first beams 1105 to determine a section in which a gesture-related object 1120 is disposed. In this example, the processor 150 may determine that the gesture-related object 1120 is disposed in the sixth section and the tenth section.

According to an embodiment, when a section in which the gesture-related object 1120 is disposed has already been determined in the face authentication process, the processor 150 may control the antenna module 130 not to output the first beams 1105 to determine the section in which the gesture-related object 1120 is disposed.

When the face authentication has been completed using the first beams and the second beams, the processor 150 may determine a section to which third beams 1106 are to be output for recognizing the gesture-related object 1120. According to one embodiment, the processor 150 may control the antenna module 130 to output the third beams to the section (e.g., the sixth section and the tenth section) in which the gesture-related object 1120 is disposed. According to another embodiment, the processor 150 may control the antenna module 130 to emit the third beams toward a region (e.g., the first to third sections, the fifth to seventh sections, the ninth to eleventh section, and the thirteenth to fifteenth sections) (hereinafter, an extended region) which extends beyond the section (e.g., the sixth section and the tenth section) where the gesture-related object 1120 is disposed. The gesture-related object 1120 may have a movement range which increases over time. Thus, the processor 150 may expand the region to which the third beams are output to increase recognition efficiency of the gesture-related object 1120.

According to an embodiment, the processor 150 may determine whether to expand the region to which the third beams 1106 are output, and the size of the expansion, based on the displacement amount of the gesture-related object 1120. For example, when the gesture related to the gesture-related object 1120 is a movement of a finger, the processor 150 may not expand the region to which the third beams 1106 are output. In another example, when a gesture related to the gesture-related object 1120 is a movement of an entire hand, the processor 150 may expand the region to which the third beams 1106 are output.

According to an embodiment, the processor 150 may divide the extended region into a plurality of sub-sections, and may control the antenna module 130 to output the third beams 1106 thereto. The processor 150 may collect reflection patterns of the third beams reflected from the gesture-related object 1120 in designated time frames, using the antenna module 130 and may detect a displacement amount of the gesture-related object 1120 based on the collected patterns.

According to an embodiment, the processor 150 may control the antenna module 130 to output the third beams to the region in which the gesture-related object 1120 is disposed or the extended region to collect the reflection patterns. The processor 150 may recognize what kind of a gesture the gesture-related object 1120 is presenting via machine learning. The processor 150 may collect a reflection pattern of the third beams reflected from the gesture-related object 1120 in designated time frames to detect a displacement amount in the gesture-related object 1120. The processor 150 may convert/classify the reflection pattern to extract the feature of the pattern. The processor 150 may compare the extracted pattern feature with reference information about the gesture pre-stored in the memory. The processor 150 may determine a gesture having a high matching level with the reference information, based on the comparison result.

According to an embodiment, the processor 150 may recognize the gesture-related object 1120 using a FGDSR (Fine-Grained Dynamic Gesture Recognition) method using a RFS (Radio-Frequency Spectrum).

Figure 12:
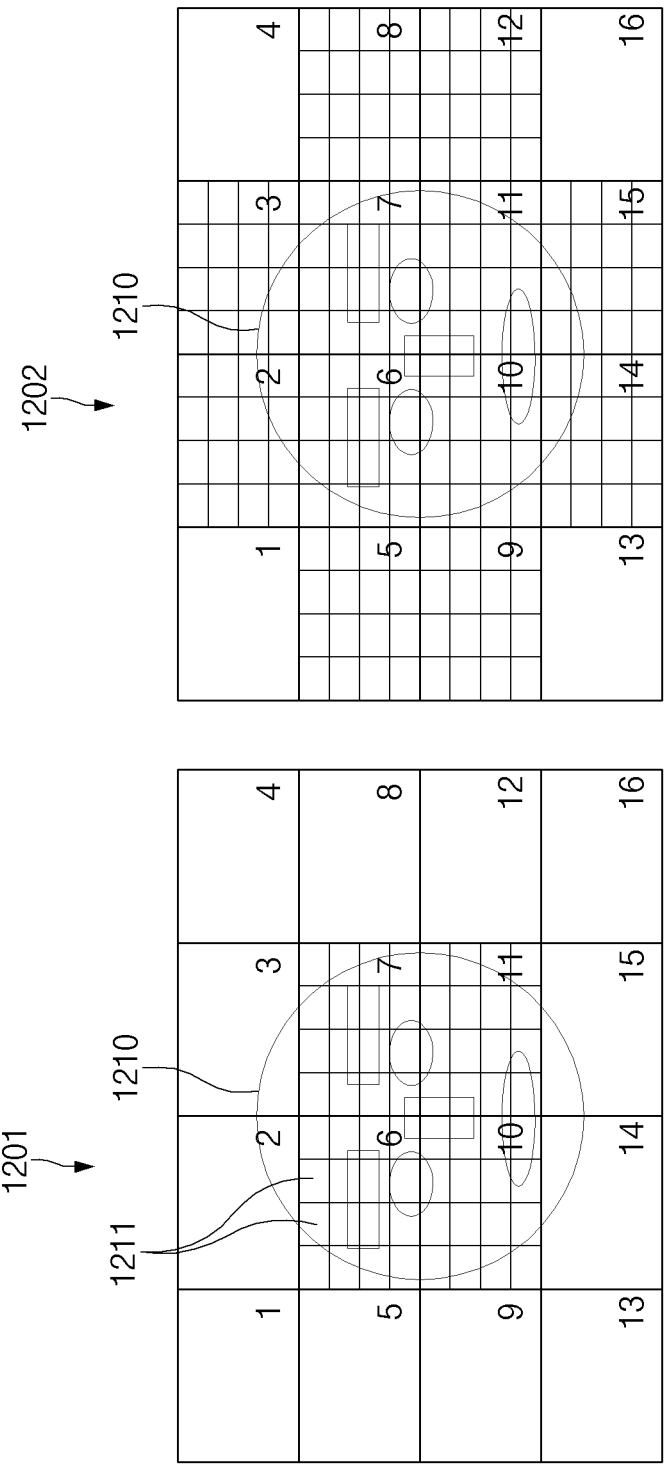
FIG. 12 is an exemplary diagram for detecting a facial expression after face detection according to an embodiment.

FIG. 12 is an exemplary diagram for detecting a facial expression after face detection according to an embodiment.

Referring to FIG. 12, after the face authentication has been completed, the processor 150 may control the antenna module 130 to output the third beams to recognize the facial expression of a facial object 1210.

According to one embodiment, in a facial object recognized state 1201, the processor 150 may control the antenna module 130 to output the third beams toward a section containing the major feature (landmark) (e.g., the sixth section, the seventh section, the tenth section and the eleventh section) to recognize the user's facial expression. For example, the user's facial expression may be determined based on how the shape of the eye and the shape of the mouth have changed relative to those of the resting face of the user.

According to one embodiment, the processor 150 may divide the section containing the major feature (landmark) (e.g., the sixth section, the seventh section, the tenth section, and the eleventh section) into at least a plurality of sub-sections 1211. The processor 150 may control the antenna module 130 to output the third beams to each sub-section.

According to another embodiment, in the facial object recognized state 1202, the processor 150 may control the antenna module 130 to output the third beams to the region (e.g., the second section, the third section, the fifth to twelfth section, the fourteenth section, and the fifteenth section) which extends beyond the section (e.g., the sixth section, the seventh section, the tenth section and the eleventh section) that primarily contains the facial object 1210. Thus, the processor 150 may detect the changes in major facial muscles and even neck movement.

According to one embodiment, when a separate gesture-related object is disposed around the facial object 1210 in the first spatial range, the processor 150 may not perform a separate facial expression recognition process. According to another embodiment, when a separate gesture-related object is disposed around the facial object 1210 in the first spatial range, recognition of motion of the gesture-related object and facial expression recognition of the facial object 1210 may be performed simultaneously by the processor 150.

Figure 13:
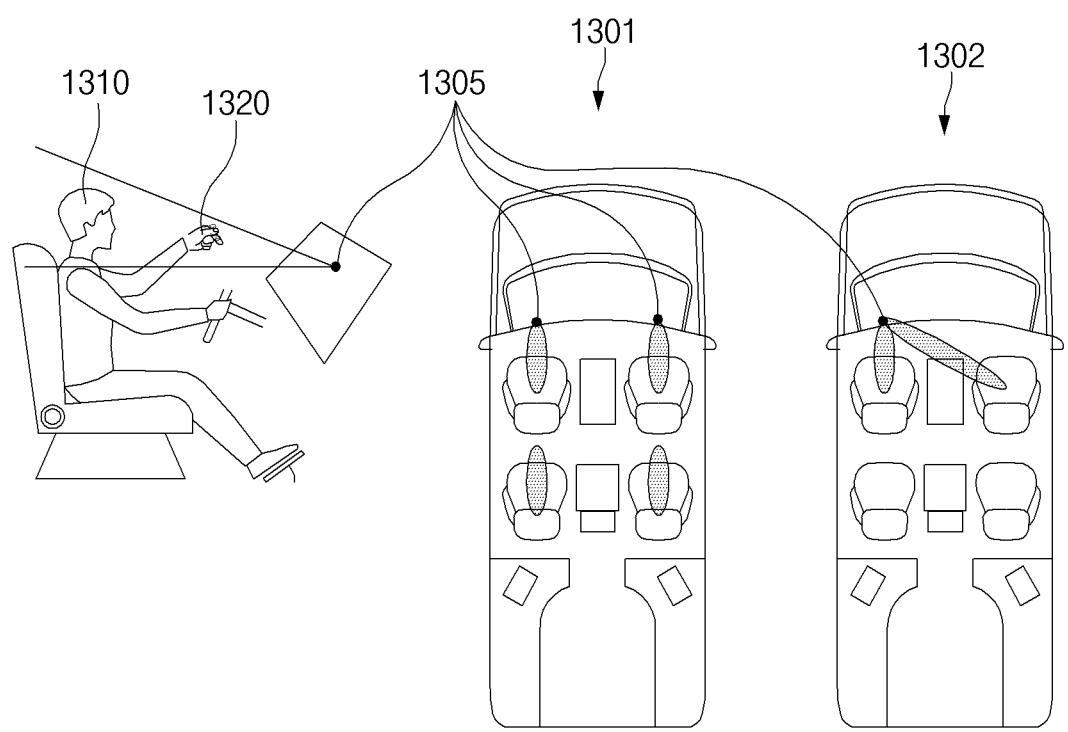
FIG. 13 is an exemplary diagram showing use of a gesture or facial expression recognition result in a vehicle according to an embodiment.

FIG. 13 is an exemplary diagram showing use of a gesture or facial expression recognition result in a vehicle according to an embodiment.

Referring to FIG. 13, the vehicle may include an antenna module 1305 that may emit/receive millimeter-wave toward a dashboard or a seat.

According to one embodiment, as a reference numeral 1301 indicates, the antenna module 1305 may include a plurality of antenna modules to detect passengers sitting on seats. According to another embodiment, as a reference numeral 1302 indicates, one antenna module 1305 may be disposed on the dashboard of the vehicle to output millimeter-wave to the driver's seat and the passenger seat. In this case, the antenna module 1305 may alternatingly recognize the driver sitting on the driver's seat or the passenger sitting on the passenger seat.

A user's facial object 1310 or a gesture-related object 1320 may be contained within the first spatial range around the antenna module 1305. The processor (e.g., the processor 150 in FIG. 1) that controls the antenna module 1305 may recognize the gesture-related object 1320 when authentication of the facial object 1310 has been completed.

For example, the processor may perform a function (e.g., play music, search for navigation, or change display content) corresponding to the recognized gesture-related object 1320.

In another example, the processor may periodically detect the movement and the state of the facial object 1310. When the user closes his/her eyes for a specified time duration or greater while driving the vehicle, or when it is determined that the user's face cannot be recognized, the processor may output a user alarm to remind the user of this situation or may change a current vehicle mode to an autonomous driving mode.

Figure 14:
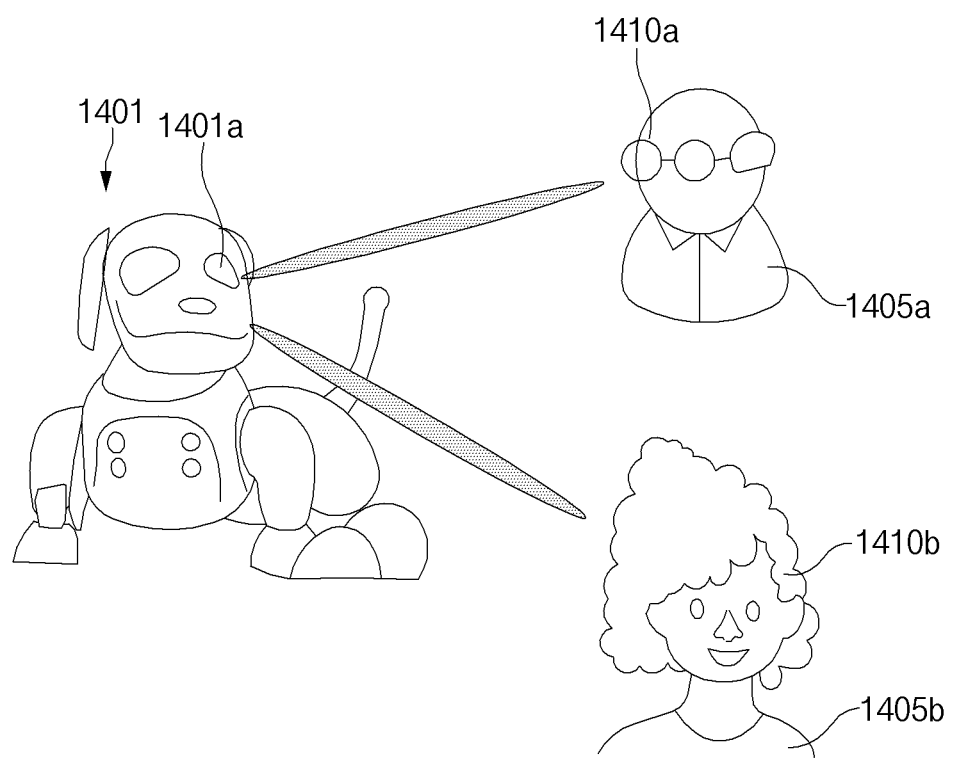
FIG. 14 is an exemplary diagram for recognizing a gesture or facial expression in an AI speaker or robot according to an embodiment.

FIG. 14 is an exemplary diagram for recognizing a gesture or facial expression in an AI speaker or robot according to an embodiment.

Referring to FIG. 14, the AI speaker or robot 1401 may include an antenna module 1401a. Facial objects 1410a and 1410b of users 1405a and 1405b may be contained within a coverage of the antenna module 1401a. When authentication of the facial objects 1410a and 1410b has been completed, the processor (e.g., the processor 150 in FIG. 1) controlling the antenna module 1401a may recognize the facial expressions of the facial objects 1410a and 1410b or the gestures of the users 1405a and 1405b. The processor may output a response corresponding to the recognized facial expression or gesture. The processor may distinguish nuances of the user's utterance via facial expression recognition. For example, the processor may recognize the user's facial expression to determine another option. When the user makes a facial expression or gesture pointing in a specific direction, the processor may select an IoT device related to that direction.

According to certain embodiments, an electronic device such as a smartphone, a tablet PC, or a laptop PC may recognize the user's facial expression or gesture using the millimeter-wave.

According to one embodiment, the electronic device may recognize whether the user is actually currently wearing a specific wearable device, and may prepare a related service based on the recognition result. For example, in a state in which the electronic device is paired with another audio device, the electronic device may detect whether the user is looking at the electronic device while wearing an audio accessory (e.g., headset). The electronic device may output a beam to the user's face and to surroundings around the face. When the same or similar object as or to the headset is recognized in a region corresponding to the user's ear, the electronic device may output a pop-up asking whether to output audio content to the corresponding audio accessory, or change the audio content automatically without a separate pop-up. When the user does not wear the specific wearable device, the electronic device may output a corresponding interface. For example, the electronic device may guide the user by outputting a pop-up indicating that the wearable device may be used by the user. In another example, when the user is looking at a screen while the user frowns or squints, the electronic device may adjust a display to be brighter or adjust a text size to be larger.

In another example, when the user is sleeping, the electronic device may switch to a power saving mode or adjust the user's schedule. Further, when the user receives a message or a call while the user is asleep, the electronic device may switch to a transmission mode of a message indicating being absent or an automatic answering mode.

In another example, when a non-authenticated user attempts to use the electronic device, the electronic device may temporarily lock a screen.

Figure 15:
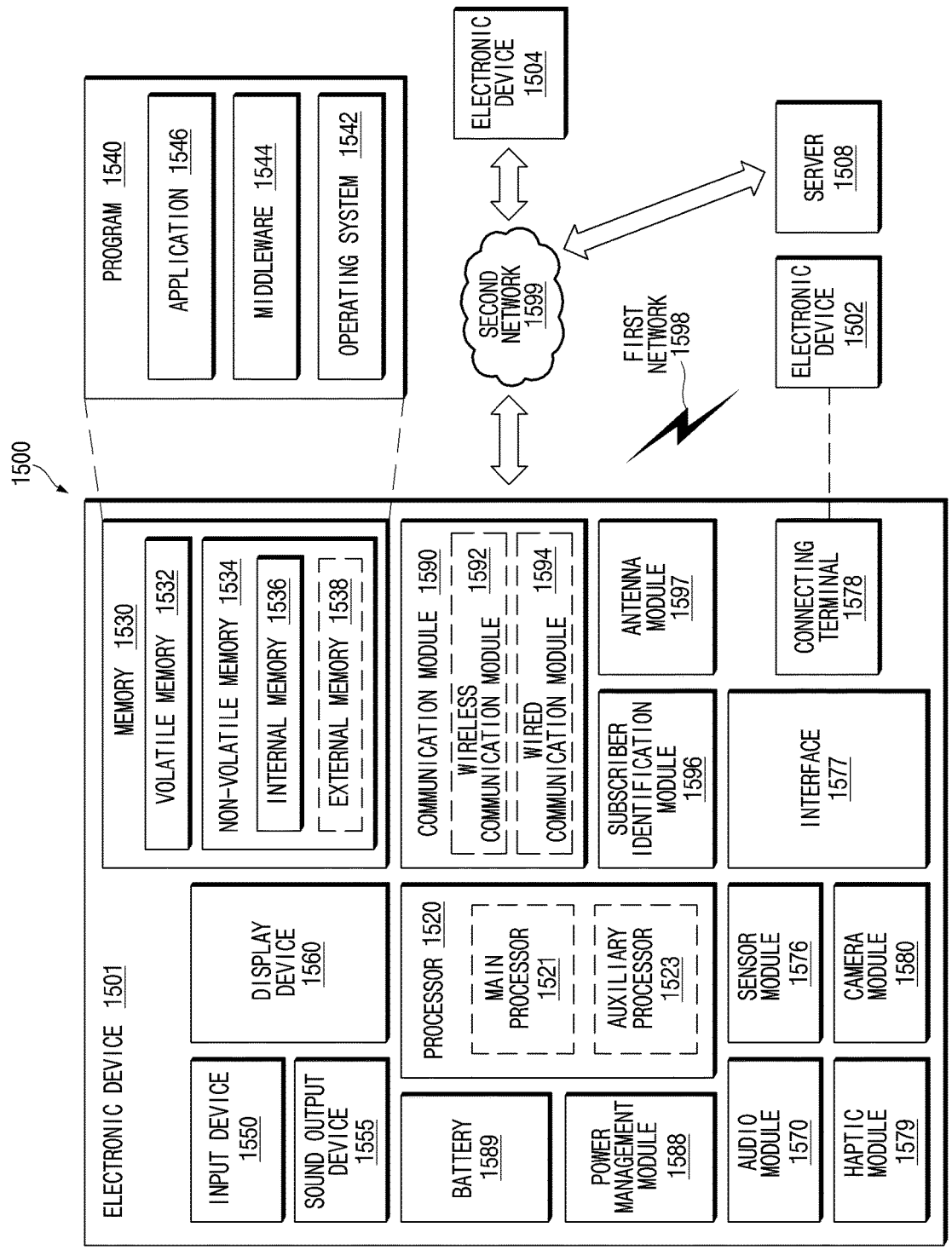
FIG. 15 is a block diagram of an electronic device in a network environment according to various embodiments.

FIG. 15 illustrates a block diagram of an electronic device 1501 in a network environment 1500, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs),tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 15, under the network environment 1500, the electronic device may communicate with an electronic device 1502 through local wireless communication 1598 or may communication with an electronic device 1504 or a server 1508 through a network 1599. According to an embodiment, the electronic device 1501 may communicate with the electronic device 2004 through the server 1508.

FIG. 15 illustrates a block diagram of an electronic device 1501 (e.g., the electronic device 101 of FIG. 1) in a network environment 1500, according to various embodiments. Referring to FIG. 15, under the network environment 1500, the electronic device may communicate with an electronic device 1502 through local wireless communication 1598 or may communication with an electronic device 1504 or a server 1508 through a network 1599. According to an embodiment, the electronic device 1501 may communicate with the electronic device 1504 through the server 1508. According to an embodiment, the electronic device 1501 may include a processor 1520 (e.g., the processor 150 of FIG. 1), a memory 1530 (e.g., the memory 160 of FIG. 1), an input device 1550, a display device 1560 (e.g., the display 110 of FIG. 1), an audio module 1570, a sensor module 1576, an interface 1577, a haptic module 1579, a camera module 1580, a power management module 1588, a battery 1589, a communication module 1590, and a subscriber identification module 1596. According to an embodiment, the electronic device 1501 may not include at least one (e.g., the display device 1560 or the camera module 1580) of the above-described elements or may further include other element(s).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

An electronic device (e.g., the electronic device 101 of FIG. 1) according to an embodiment may include an antenna module (e.g., the antenna module 130 of FIG. 1) capable of emitting and receiving millimeter-wave, a communication circuit (e.g., the communication circuit 140 in FIG. 1) capable of controlling the antenna module (e.g., the antenna module 130 of FIG. 1), a processor (e.g., the processor 150 in FIG. 1) operatively connected to the communication circuit (e.g., the communication circuit 140 in FIG. 1), and a memory (e.g., the memory 160 in FIG. 1) operatively associated with the processor (e.g., the processor 150 in FIG. 1). The memory (e.g., the memory 160 in FIG. 1) may store therein instructions. When the instructions are executed by the processor (e.g., the processor 150 in FIG. 1), the instructions may cause the processor (e.g., the processor 150 in FIG. 1) to control the antenna module (e.g., the antenna module 130 in FIG. 1) to output the first beams having the first beam width toward the first spatial range around the electronic device (e.g., the electronic device 101 in FIG. 1), to control the antenna module (e.g., the antenna module 130 of FIG. 1) to receive the first reflection pattern of the first beams, to determine at least one section in which at least one external object is disposed among a plurality of sections constituting the first spatial range, based on the first reflection pattern of the first beams, to control the antenna module (e.g., the antenna module 130 in FIG. 1) to output the second beams having the second beam width smaller than the first beam width toward the at least one section, to control the antenna module (e.g., the antenna module 130 of FIG. 1) to receive the second reflection pattern of the second beams, to authenticate the user based on a recognizing result of the at least one external object based on the second reflection pattern of the second beams, to control the antenna module (e.g., the antenna module 130 in FIG. 1) to output the third beams when the user is authenticated, and to determine the state information or motion information of the at least one external object.

According to an embodiment, the instructions may cause the processor (e.g., the processor 150 of FIG. 1) to control the antenna module (e.g., the antenna module 130 of FIG. 1) to output the third beams to a region which extends beyond the at least one section.

According to an embodiment, each of the third beams may have the third beam width equal to or smaller than the second beam width.

According to an embodiment, the instructions may cause the processor (e.g., the processor 150 in FIG. 1) to recognize the user's face based on the second reflection pattern, and authenticate the user based on a comparing result between the reference information stored in the memory (e.g., the memory 160 in FIG. 1) and the second reflection pattern. The state information may be facial expression information of a user' face.

According to an embodiment, the electronic device (e.g., the electronic device 101 of FIG. 1) may further include a camera (e.g., the camera 170 of FIG. 1) operatively connected to the processor. The instructions may cause the processor (e.g., the processor 150 in FIG. 1) to determine the output direction of the first beams based on the FOV of the camera (e.g., camera 170 in FIG. 1).

According to an embodiment, the instructions may cause the processor (e.g., the processor 150 in FIG. 1) to execute a specified function of an application based on the state information or the motion information.

According to an embodiment, the electronic device (e.g., the electronic device 101 of FIG. 1) may further include a luminance sensor operatively connected to the processor. The instructions may cause the processor (e.g., the processor 150 in FIG. 1) to control the luminance sensor to detect an illuminance level around the electronic device (e.g., the electronic device 101 in FIG. 1), and to activate the antenna module (e.g., the antenna module 130 in FIG. 1) under when specified condition related to the detected illuminance level is satisfied.

According to an embodiment, the instructions may cause the processor (e.g., the processor 150 in FIG. 1) to determine the depth information of the at least one external object based on the first reflection pattern, and to determine the number or type of the at least one external object, based on the determined depth information.

According to an embodiment, the electronic device (e.g., the electronic device 101 of FIG. 1) may further include a display (e.g., the display 110 of FIG. 1) operatively connected to the processor. The antenna module (e.g., the antenna module 130 in FIG. 1) may output the first beams, the second beams, and/or the third beams in a direction in which a display surface of the display (e.g., the display 110 in FIG. 1) is facing.

According to an embodiment, when the processor (e.g., the processor 150 in FIG. 1) detects, based on the first reflection pattern, the user's facial object and at least one gesture-related object in the first spatial range, the instructions may cause the processor (e.g., the processor 150 in FIG. 1) to control the antenna module (e.g., the antenna module 130 in FIG. 1) to output the second beams toward a first section where the facial object is disposed, and to control the antenna module (e.g., the antenna module 130 in FIG. 1) to output the third beams toward a second section where the at least one gesture-related object is placed.

According to an embodiment, when the processor (e.g., the processor 150 in FIG. 1) recognizes, based on the first reflection pattern, that the facial object and the gesture-related object overlap each other, the instructions may cause the processor (e.g., the processor 150 in FIG. 1) to perform the user authentication based on a portion in which the facial object and the gesture-related object do not overlap each other.

According to an embodiment, the instructions may cause the processor (e.g., the processor 150 in FIG. 1) to perform the user authentication again after waiting for a specified time duration when the user authentication fails.

An object recognition method according to an embodiment may be performed in an electronic device (e.g., the electronic device 101 of FIG. 1). The method may include controlling an antenna module (e.g., the antenna module 130 of FIG. 1) capable of emitting and receiving the millimeter-waves to output the first beams having the first beam width toward the first spatial range around the electronic device (e.g., the electronic device 101 in FIG. 1), controlling the antenna module (e.g., the antenna module 130 of FIG. 1) to receive the first reflection pattern of the first beams, determining at least one section in which at least one external object is disposed among a plurality of sections constituting the first spatial range, based on the first reflection pattern, controlling the antenna module (e.g., the antenna module 130 in FIG. 1) to output the second beams having the second beam width toward the at least one section, controlling the antenna module (e.g., the antenna module 130 of FIG. 1) to receive the second reflection pattern of the second beams, authenticating the user based on the recognizing result of the at least one external object based on the second reflection pattern, controlling the antenna module (e.g., the antenna module 130 in FIG. 1) to output the third beams when the user is authenticated, controlling the antenna module (e.g., the antenna module 130 of FIG. 1) to receive a third reflection pattern of the third beams, and determining the state information or motion information of the at least one external object based on the third reflection pattern.

According to an embodiment, the controlling of the antenna module (e.g., the antenna module 130 of FIG. 1) to output the third beams may include controlling the antenna module (e.g., the antenna module 130 of FIG. 1) to output the third beams toward a region which extends beyond the at least one section.

According to an embodiment, the controlling of the antenna module (e.g., the antenna module 130 of FIG. 1) to output the third beams may include controlling the antenna module (e.g., the antenna module 130 of FIG. 1) to output the third beams having the third beam width equal to or smaller than the second beam width.

According to an embodiment, the authenticating of the user may include recognizing the user's face based on the second reflection pattern, and comparing the second reflection pattern with reference information stored in the memory (e.g., the memory 160 in FIG. 1) of the electronic device (e.g., the electronic device 101 in FIG. 1).

According to an embodiment, the controlling of the antenna module (e.g., the antenna module 130 of FIG. 1) to output the first beams may include determining the output direction of the first beams based on the FOV of the camera (e.g., the camera 170 of FIG. 1) of the electronic device (e.g., the electronic device 101 of FIG. 1).

According to an embodiment, the determining of the at least one section may include determining depth information of the at least one external object based on the first reflection pattern, and determining the number or type of the at least one external object, based on the determined depth information.

A computer-readable storage medium according to various embodiments may store therein instructions executable by a processor (e.g., the processor 150 in FIG. 1). When the instructions are executed by the processor (e.g., the processor 150 in FIG. 1) of the electronic device (e.g., the electronic device 101 in FIG. 1), the instructions may cause the processor to control an antenna module (e.g., the antenna module 130 of FIG. 1) capable of emitting and receiving the millimeter-waves to output the first beams having the first beam width toward the first spatial range around the electronic device (e.g., the electronic device 101 in FIG. 1), control the antenna module (e.g., the antenna module 130 of FIG. 1) to receive the first reflection pattern of the first beams, determine at least one section in which at least one external object is disposed among a plurality of sections constituting the first spatial range, based on the first reflection pattern, control the antenna module (e.g., the antenna module 130 in FIG. 1) to output the second beams having the second beam width toward the at least one section, control the antenna module (e.g., the antenna module 130 of FIG. 1) to receive the second reflection pattern of the second beams, authenticate the user based on the recognizing result of the at least one external object based on the second reflection pattern, control the antenna module (e.g., the antenna module 130 in FIG. 1) to output the third beams when the user is authenticated, control the antenna module (e.g., the antenna module 130 of FIG. 1) to receive a third reflection pattern of the third beams, and determine the state information or motion information of the at least one external object based on the third reflection pattern.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an antenna module configured to emit and receive millimeter-wave;
a communication circuit configured to control the antenna module;
a processor operatively connected to the communication circuit;
a luminance sensor operatively connected to the processor, and
a memory operatively connected to the processor,
wherein the memory stores therein instructions,
wherein when the instructions are executed by the processor, the instructions cause the processor to:
control the luminance sensor to detect an illuminance level around the electronic device; and
activate the antenna module when a condition related to the detected illuminance level is satisfied,
control the antenna module to output first beams having a first beam width toward a first spatial range around the electronic device;
control the antenna module to receive a first reflection pattern of the first beams;
determine at least one section containing one or more external objects among a plurality of sections constituting the first spatial range, based on the first reflection pattern of the first beams;
upon detecting, based on the first reflection pattern, a user's face and at least one gesture-related object of the user in the first spatial range, control the antenna module to output second beams having a second beam width smaller than the first beam width toward a first section where the user's face is disposed;
control the antenna module to receive a second reflection pattern of the second beams;
recognize the one or more external objects based on the second reflection pattern of the second beams, and authenticate the user based on the recognizing result; and
control the antenna module to output third beams to a second section where the at least one gesture-related object is disposed when the user is authenticated, and determine state information or motion information of the one or more external objects, based on the third beams.

2. The electronic device of claim 1, wherein the instructions cause the processor to control the antenna module to output the third beams toward a region which extends beyond the at least one section.

3. The electronic device of claim 1, wherein each of the third beams has a third beam width equal to or smaller than the second beam width.

4. The electronic device of claim 1, wherein the instructions cause the processor to:
recognize the user's face based on the second reflection pattern; and
compare reference information stored in the memory with the second reflection pattern and authenticate the user based on the comparing result.

5. The electronic device of claim 4, wherein the state information includes information about a facial expression of the user's face.

6. The electronic device of claim 1, wherein the device further comprises a camera operatively connected to the processor, and
wherein the instructions cause the processor to determine an output direction of the first beams, based on a field of view (FOV) of the camera.

7. The electronic device of claim 1, wherein the instructions cause the processor to execute a specified function of an application, based on the state information or the motion information.

8. The electronic device of claim 1, wherein the instructions cause the processor to:
determine depth information of the one or more external objects based on the first reflection pattern; and
determine a number of the one or more external objects or a type of the one or more external objects, based on the determined depth information.

9. The electronic device of claim 1, wherein the device further comprises a display operatively connected to the processor, and
wherein the antenna module outputs the first beams, the second beams, and/or the third beams in a direction in which a display surface of the display is facing.

10. The electronic device of claim 1, wherein the instructions cause the processor to:
upon recognizing, based on the first reflection pattern, that the user's face and the gesture-related object overlap each other, perform user authentication based on a non-overlapping portion between the user's face and the gesture-related object.

11. An object recognition method performed by an electronic device, the method comprising:
controlling a luminance sensor of the electronic device to detect an illuminance level around the electronic device; and
activating an antenna module of the electronic device when a condition related to the detected illuminance level is satisfied,
controlling the antenna module to output first beams having a first beam width toward a first spatial range around the electronic device, wherein the antenna module emits and receives millimeter-wave;
controlling the antenna module to receive a first reflection pattern of the first beams;
determining at least one section containing an external object among a plurality of sections constituting the first spatial range, based on the first reflection pattern of the first beams;
upon detecting, based on the first reflection pattern, a user's face and at least one gesture-related object of the user in the first spatial range, controlling the antenna module to output second beams having a second beam width toward a first section where the user's face is disposed;
controlling the antenna module to receive a second reflection pattern of the second beams;
recognizing the external object based on the second reflection pattern of the second beams, and authenticating the user based on the recognizing result;
controlling the antenna module to output third beams to a second section where the at least one gesture-related object is disposed when the user is authenticated;
controlling the antenna module to receive a third reflection pattern of the third beams; and
determining state information or motion information of the external object, based on the third reflection pattern of the third beams.

12. The method of claim 11, wherein the determining of the at least one section includes:
determining depth information of the external object, based on the first reflection pattern; and
determining a number of the external objects or a type of the external object, based on the determined depth information.

13. A non-transitory computer-readable storage medium storing therein instructions executable by a processor, wherein when the instructions are executed by a processor of an electronic device, the instructions cause the processor to:
control a luminance sensor of the electronic device to detect an illuminance level around the electronic device; and
activate an antenna module of the electronic device when a condition related to the detected illuminance level is satisfied,
control the antenna module to output first beams having a first beam width toward a first spatial range around the electronic device, wherein the antenna module emits and receives millimeter-wave;
control the antenna module to receive a first reflection pattern of the first beams;
determine at least one section containing an external object among a plurality of sections constituting the first spatial range, based on the first reflection pattern of the first beams;
upon detecting, based on the first reflection pattern, a user's face and at least one gesture-related object of the user in the first spatial range, control the antenna module to output second beams having a second beam width toward a first section where the user's face is disposed;
control the antenna module to receive a second reflection pattern of the second beams;
recognize the external object based on the second reflection pattern of the second beams, and authenticate the user based on the recognizing result;
control the antenna module to output third beams to a second section where the at least one gesture-related object is disposed when the user is authenticated;
control the antenna module to receive a third reflection pattern of the third beams; and
determine state information or motion information of the external object, based on the third reflection pattern of the third beams.

* * * * *